(12) United States Patent
Fernandez et al.

(10) Patent No.: US 9,476,899 B2
(45) Date of Patent: Oct. 25, 2016

(54) CIRCUITS AND METHODS FOR GENERATING A THRESHOLD SIGNAL USED IN A MOTION DETECTOR IN ACCORDANCE WITH A LEAST COMMON MULTIPLE OF A SET OF POSSIBLE QUANTITIES OF FEATURES UPON A TARGET

(71) Applicant: Allegro MicroSystems, LLC, Worcester, MA (US)

(72) Inventors: Devon Fernandez, Londonderry, NH (US); Michael Morris, Deerfield, NH (US); William P. Taylor, Amherst, NH (US); P. Karl Scheller, Bow, NH (US)

(73) Assignee: Allegro MicroSystems, LLC, Worcester, MA (US)

( * ) Notice: Subject to any disclaimer, the term of this patent is extended or adjusted under 35 U.S.C. 154(b) by 174 days.

(21) Appl. No.: 14/452,823

(22) Filed: Aug. 6, 2014

(65) Prior Publication Data
US 2015/0061656 A1 Mar. 5, 2015

Related U.S. Application Data

(60) Provisional application No. 61/871,969, filed on Aug. 30, 2013.

(51) Int. Cl.
*G01R 33/00* (2006.01)
*G01P 13/00* (2006.01)
(Continued)

(52) U.S. Cl.
CPC .............. *G01P 13/00* (2013.01); *G01B 7/003* (2013.01); *G01B 7/30* (2013.01); *G01D 5/145* (2013.01); *G01D 5/2448* (2013.01); *G01P 3/44* (2013.01); *G01P 3/488* (2013.01); *G01P 3/489* (2013.01)

(58) Field of Classification Search
CPC .......... G01P 13/00; G01P 3/44; G01P 3/488; G01P 3/489; G01B 7/003; G01B 7/30; G01B 7/00; G01B 7/04; G01D 5/2448; G01D 5/145; G01R 33/02; G01R 33/00; G01R 33/07; G01R 33/09; G01R 15/148; G01R 15/207; G01R 19/00; G01R 15/14; G01R 15/20
See application file for complete search history.

(56) References Cited

U.S. PATENT DOCUMENTS

| 4,015,466 A | 4/1977 | Stick et al. |
| 4,185,265 A | 1/1980 | Griffin et al. |

(Continued)

FOREIGN PATENT DOCUMENTS

| DE | 197 49 791 A1 | 5/1999 |
| EP | 0 036 950 A1 | 10/1981 |

(Continued)

OTHER PUBLICATIONS

Japanese Office Action (English translation) dated Dec. 17, 2014; for Japanese Pat. App. No. 2013-513175; 3 pages.

(Continued)

*Primary Examiner* — Son Le
(74) *Attorney, Agent, or Firm* — Daly, Crowley, Mofford & Durkee, LLP

(57) ABSTRACT

A circuit to detect a movement of an object provides a threshold selection module or a peak identifier module that uses one or more threshold signals identified prior to a present cycle of magnetic field signal in order to establish a threshold signal used for a present cycle of the magnetic field signal. A method associated with the circuit is also described. The circuit and method can be tailored to store values associated with a least common multiple of a set of possible quantities of detectable features on target objects.

36 Claims, 20 Drawing Sheets

(51) Int. Cl.
| | |
|---|---|
| *G01B 7/00* | (2006.01) |
| *G01B 7/30* | (2006.01) |
| *G01P 3/44* | (2006.01) |
| *G01P 3/488* | (2006.01) |
| *G01P 3/489* | (2006.01) |
| *G01D 5/14* | (2006.01) |
| *G01D 5/244* | (2006.01) |

(56) References Cited

U.S. PATENT DOCUMENTS

| | | |
|---|---|---|
| 4,293,814 A | 10/1981 | Boyer |
| 4,367,721 A | 1/1983 | Boyer |
| 4,374,333 A | 2/1983 | Avery |
| 4,443,716 A | 4/1984 | Avery |
| 4,476,901 A | 10/1984 | Sainen |
| 4,705,964 A | 11/1987 | Higgs |
| 4,906,928 A | 3/1990 | Gard |
| 4,992,731 A | 2/1991 | Lorenzen |
| 5,103,171 A | 4/1992 | Petersen |
| 5,291,133 A | 3/1994 | Gokhale et al. |
| 5,317,258 A | 5/1994 | Setzer et al. |
| 5,442,283 A | 8/1995 | Vig et al. |
| 5,459,398 A | 10/1995 | Hansen et al. |
| 5,477,142 A | 12/1995 | Good et al. |
| 5,493,219 A | 2/1996 | Makino et al. |
| 5,497,084 A | 3/1996 | Bicking |
| 5,497,086 A | 3/1996 | Hynek et al. |
| 5,510,706 A | 4/1996 | Good |
| 5,650,719 A | 7/1997 | Moody et al. |
| 5,694,038 A | 12/1997 | Moody et al. |
| 5,729,127 A | 3/1998 | Tamura et al. |
| 5,821,745 A | 10/1998 | Makino et al. |
| 5,917,320 A | 6/1999 | Scheller et al. |
| 6,091,239 A | 7/2000 | Vig et al. |
| 6,191,576 B1 | 2/2001 | Ricks et al. |
| 6,204,658 B1 | 3/2001 | Stanusch et al. |
| 6,242,908 B1 | 6/2001 | Scheller et al. |
| 6,456,063 B1 | 9/2002 | Moreno et al. |
| 6,522,131 B1 | 2/2003 | Hiligsmann et al. |
| 6,525,531 B2 | 2/2003 | Forrest et al. |
| 6,785,639 B2 | 8/2004 | Shirai et al. |
| 7,138,793 B1 | 11/2006 | Bailey |
| 7,184,876 B2 | 2/2007 | Teulings et al. |
| 7,362,094 B2 | 4/2008 | Voisine et al. |
| 8,299,783 B2 * | 10/2012 | Fernandez ............... 324/202 |
| 8,350,563 B2 | 1/2013 | Haas et al. |
| 8,598,867 B2 | 12/2013 | Foletto et al. |
| 8,723,512 B1 | 5/2014 | Burdette et al. |
| 8,736,260 B2 | 5/2014 | Foletto et al. |
| 2001/0033159 A1 | 10/2001 | Forrest et al. |
| 2005/0073297 A1 | 4/2005 | Walter et al. |
| 2005/0075827 A1 | 4/2005 | Tsuruhara et al. |
| 2009/0058404 A1 | 3/2009 | Kurumado |
| 2010/0231202 A1 | 9/2010 | Scheller et al. |
| 2011/0298447 A1 * | 12/2011 | Foletto ............... G01D 5/145 324/207.2 |
| 2011/0298448 A1 | 12/2011 | Foletto et al. |
| 2011/0298449 A1 * | 12/2011 | Foletto ............... G01D 5/24452 324/207.13 |
| 2011/0298450 A1 | 12/2011 | Foletto et al. |
| 2012/0041711 A1 | 2/2012 | Jacoby et al. |
| 2012/0249126 A1 | 10/2012 | Friedrich et al. |
| 2013/0093416 A1 | 4/2013 | Haas et al. |
| 2014/0062463 A1 | 3/2014 | Foletto et al. |
| 2014/0195186 A1 | 7/2014 | Carbonne et al. |
| 2014/0222364 A1 | 8/2014 | Foletto et al. |
| 2014/0266176 A1 | 9/2014 | Fernandez et al. |

FOREIGN PATENT DOCUMENTS

| | | |
|---|---|---|
| EP | 0 602 697 A1 | 6/1994 |
| EP | 0 621 460 A1 | 10/1994 |
| EP | 0 875 733 A2 | 11/1998 |
| EP | 0 875 733 A3 | 11/1998 |
| EP | 0 875 774 A2 | 11/1998 |
| GB | 2 309 311 A | 7/1997 |
| JP | 11-44554 | 2/1999 |
| JP | 2005-106822 | 4/2005 |
| WO | WO 00/57136 | 9/2000 |
| WO | WO 02/054014 A1 | 7/2002 |
| WO | WO 2005/124287 A1 | 12/2005 |
| WO | WO 2011/152948 A1 | 12/2011 |
| WO | WO 2013/017211 A1 | 2/2013 |
| WO | WO 2014/081522 A1 | 5/2014 |

OTHER PUBLICATIONS

Office Action dated Jan. 21, 2016; for U.S. Appl. No. 14/061,106; 21 pages.
PCT Search Report and Written Opinion of the ISA dated Feb. 27, 2015 for PCT Pat. App. No. PCT/US2014/049882; 24 pages.
International Preliminary Report on Patentability and Written Opinion of the ISA dated Mar. 10, 2016; For PCT Pat. App. No. PCT/US2014/049882; 17 pages.
Letter from Yuasa and Hara dated Mar. 31, 2015; for Japanese Pat. App. No. 2013-213175; 1 page.
Japanese Response filed on Mar. 10, 2015; for Japanese Pat. App. No. 2013-213175; 11 pages.
Japanese Claims (English translation) filed Mar. 10, 2015; for Japanese Pat. App. No. 2013-213175; 10 pages.
Letter from Yuasa and Hara dated Apr. 1, 2015; for Japanese Pat. App. No. 2013-213175; 1 page.
Japanese Notice of Allowance received Apr. 1, 2015; for Japanese Pat. App. No. 2013-213175; 3 pages.
Japanese Allowed Claims received Apr. 1, 2015; for Japanese Pat. App. No. 2013-213175; 9 pages.
Letter to 21$^{st}$ Century Patent and Law Firm with Amended Claims dated Mar. 17, 2016; For Korean Pat. App. No. 10-2012-7033399; 14 pages.
Email from 21$^{st}$ Century Patent and Law Firm with Proposed Claim Amendments dated Mar. 23, 2016; For Korean Pat. App. No. 10-2012-7033399; 13 pages.
Letter to 21$^{st}$ Century Patent and Law Firm dated Mar. 28, 2016; For Korean Pat. App. No. 10-2012-7033399; 1 page.
Letter from 21$^{st}$ Century Patent and Law Firm dated Mar. 30, 2016; For Korean Pat. App. No. 10-2012-7033399; 1 page.
Response filed May 20, 2015; to Office Action dated Jan. 21, 2015; for U.S. Appl. No. 14/061,106; 17 pages.
International Preliminary Report on Patentability dated Jun. 4, 2015 for PCT Application No. PCT/US2013/065848; 8 pages.
Notice of Allowance dated Jun. 10, 2015: for U.S. Appl. No. 14/061,106; 12 pages.
U.S. Appl. No. 14/452,823, filed Aug. 6, 2014, Fernandez, et al.
Allegro Data Sheet; "ATS612LSB Dynamic, Self-Calibrating, Peak-Detecting, Differential Hall-Effect Gear-Tooth Sensor;" Sep. 6, 1996; 16 sheets.
Allegro Data Sheet; "ATS630, ATS631 True Power on Zero Speed Gear Tooth Sensor Sub-assembly with Adaptive Thresholds;" undated; 8 sheets.
Allegro Data Sheet; ATS630LSA and ATS631LSA Zero-Speed, Self-Calibrating, Hall-Effect Gear-Tooth True Power-On Sensors; Oct. 28, 1996; 12 sheets.
Allegro Data Sheet; A1425; "High Accuracy Analog Speed Sensor IC with Integrated Filter Capacitor and Dual Zero-Crossing Output Signal;" as published by Allegro Microsystems, Inc.; Jun. 18, 2004; pp. 1-13.
Allegro Data Sheet; ATS673 and ATS674; "Self-Calibrating TPOS Gear Tooth Sensor ICs Optimized for Automotive Cam Sensing Applications;" as published by Allegro Microsystems, Inc.; Mar. 8, 2005; pp. 1-19.
Allegro Data Sheet; ATS675LSE; "Self-Calibrating TPOS Speed Sensor IC Optimized for Automotive Cam Sensing Applications;" as published by Allegro Microsystems, Inc.; Jul. 11, 2008; pp. 1-13.
Datel Intersil; Data Acquisiton and Conversion Handbook, A Technical Guide, A/D and D/A Converting and their Applications; Jan. 1980; 3 sheets.

(56) References Cited

OTHER PUBLICATIONS

Fletcher; "An Engineering Approach to Digital Design;" Prentice Hall, Inc., Englewood Cliffs, NJ; Jan. 1980; 2 sheets.
Graeme et al.; "Operational Amplifiers Design and Applications;" McGraw-Hill Book Company; Jun. 1, 1974; 3 sheets.
Motorola; "Linear/Interface Integrated Circuits;" Series D, Motorola Inc.; Jan. 1983; 2 sheets.
Acceptance of 312 Amendment; dated Jun. 28, 1999; for U.S. Appl. No. 08/847,703; 3 sheets.
312 Amendment; dated Dec. 17, 1998; for U.S. Appl. No. 08/847,703; 4 sheets.
Notice of Allowability; dated illegible; for U.S. Appl. No. 08/847,703; 4 sheets.
Response with Terminal Disclaimer; filed Sep. 14, 1998; for U.S. Appl. No. 08/847,703; 5 sheets.
Office Action; dated Jun. 26, 1998; for U.S. Appl. No. 08/847,703; 6 sheets.
Notice of Allowance; dated Jan. 26, 2001; for U.S. Appl. No. 09/275,209; 9 pages.
Response with Terminal Disclaimer; filed Dec. 5, 2000; for U.S. Appl. No. 09/275,209; 6 pages.
Office Action; dated Sep. 27, 2000; for U.S. Appl. No. 09/275,209; 4 pages.
Notice of Allowance; dated Aug. 26, 2002; for U.S. Appl. No. 09/859,093; 11 pages.
Response with Terminal Disclaimer; filed May 28, 2002; for U.S. Appl. No. 09/859,093; 7 pages.
Office Action; dated May 7, 2002; for U.S. Appl. No. 09/859,093; 4 pages.
Office Action/Restriction Requirement dated Feb. 27, 2013; for U.S. Appl. No. 12/793,813; 6 pages.
Response to Office/Restriction Requirement dated Feb. 27, 2013; for U.S. Appl. No. 12/793,813; 6 pages.
Notice of Allowance dated Aug. 2, 2013; for U.S. Appl. No. 12/793,813; 20 pages.
312 Amendment dated Aug. 19, 2013; for U.S. Appl. No. 12/793,813; 17 pages.
Office Action dated Sep. 24, 2013; U.S. Appl. No. 13/685,287, filed Nov. 26, 2012, 14 pages.
Response to Office Action dated Sep. 24, 2013, for U.S. Appl. No. 13/685,287, filed Nov. 26, 2012, 11 pages.
Notice of Allowance dated Mar. 3, 2014 for U.S. Appl. No. 13/685,287, filed Nov. 26, 2012, 6 pages.
Request for Continued Examination dated Jan. 16, 2014; for U.S. Appl. No. 13/685,287, filed Nov. 26, 2012, 2 pages.
Notice of Allowance dated Oct. 28, 2013; for U.S. Appl. No. 13/685,287, filed Nov. 26, 2012, 8 pages.
Letter to Yuasa and Hara dated Mar. 19, 2014, and including 312 Amendment; for Japanese Pat. App. No. 2013-513175; 23 pages.
Japanese Voluntary Amendment (with Claims in English) filed Apr. 8, 2014; for Japanese Pat. App. No. 2013-513175; 23 pages.
Letter from Yuasa and Hara dated Apr. 24, 2014; for Japanese Pat. App. No. 2013-513175; 1 page.
PCT Search Report; dated Jun. 23, 2000; for PCT Pat. App. No. PCT/US00/02614; 2 sheets.
PCT International Preliminary Report on Patentability; dated May 17, 2001; for PCT Pat. App. No. PCT/US00/02614; 13 sheets.
PCT Search Report dated May 14, 2000; for PCT Pat. App. No. PCT/US01/42546; 1 sheet.
Response to PCT Written Opinion; dated Aug. 27, 2002; for PCT/US01/42546; 1 sheet.
PCT International Preliminary Report on Patentability; dated Feb. 6, 2004; for PCT/US01/42546; 6 sheets.
PCT Search Report and Written Opinion of the ISA; dated Aug. 11, 2011; for PCT Pat. App. No. PCT/US2011/035148; 11 pages.
Response filed Jun. 10, 2013; to PCT Written Opinion dated Dec. 13, 2012; 18 pages.
PCT International Preliminary Report on Patentability of the ISA; dated Dec. 13, 2012; for PCT Pat. App. No. PCT/US2011/035148; 9 sheets.
PCT Search Report and Written Opinion dated Jan. 8, 2014 for Application No. PCT/US2013/065848, filed Oct. 21, 2013, 11 pages.
PCT Invitation to Pay Additional Fees with Partial Search Report dated Nov. 14, 2014; for PCT Pat. App. No. PCT/US2014/049882; 8 pages.
Response to Written Opinion filed Dec. 10, 2015 for European Application No. 13783800.9; 23 pages.

* cited by examiner

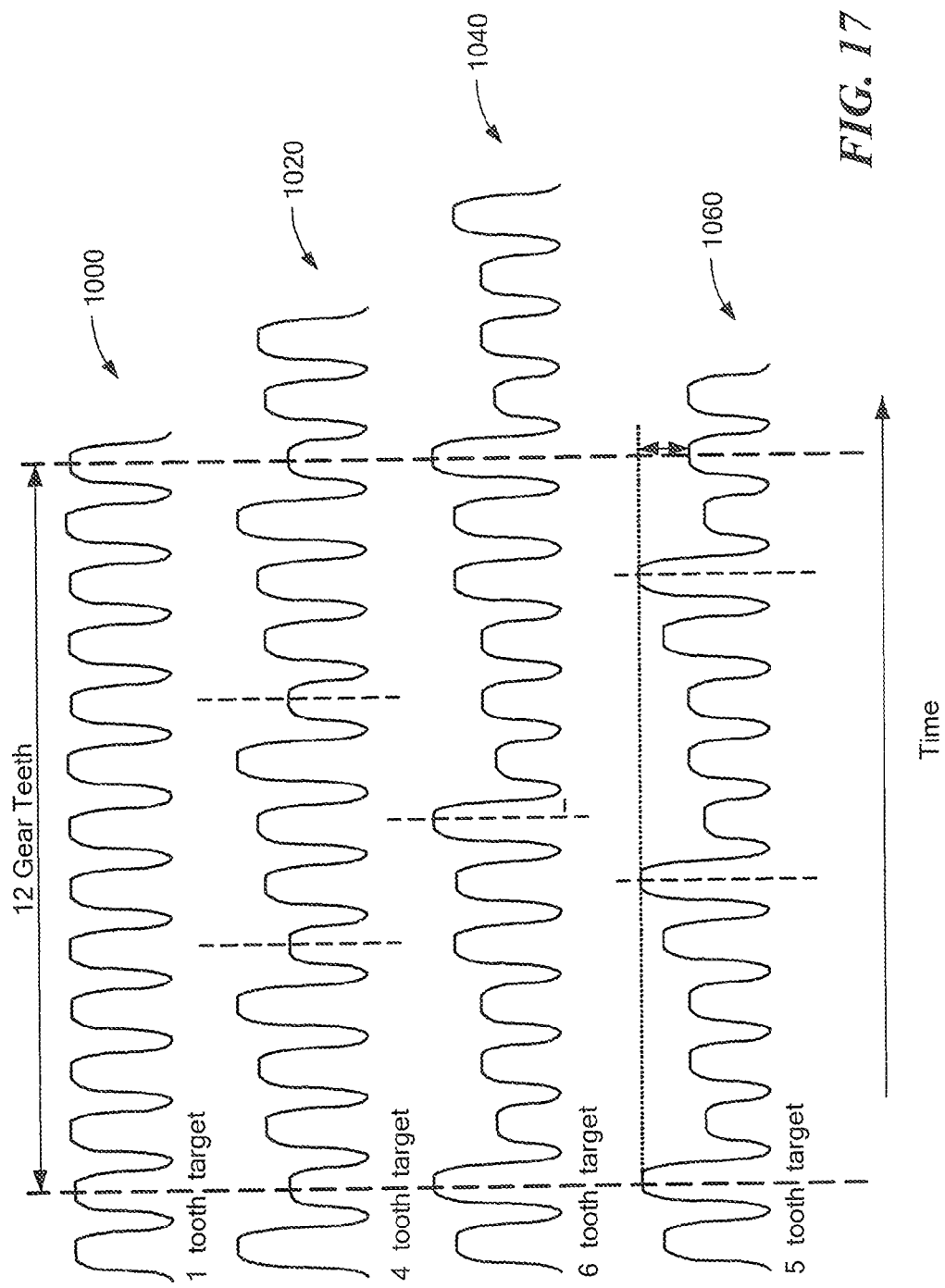

CIRCUITS AND METHODS FOR GENERATING A THRESHOLD SIGNAL USED IN A MOTION DETECTOR IN ACCORDANCE WITH A LEAST COMMON MULTIPLE OF A SET OF POSSIBLE QUANTITIES OF FEATURES UPON A TARGET

CROSS REFERENCE TO RELATED APPLICATIONS

This application claims the benefit under 35 U.S.C. §119(e) of U.S. Provisional Application No. 61/871,969 filed Aug. 30, 2013, which application is incorporated herein by reference in its entirety.

CROSS REFERENCE TO RELATED APPLICATIONS

Not applicable.

STATEMENT REGARDING FEDERALLY SPONSORED RESEARCH

Not applicable.

FIELD OF THE INVENTION

This invention relates generally to integrated circuits and, more particularly, to integrated circuits for detecting a movement or a rotation of a ferromagnetic object.

BACKGROUND OF THE INVENTION

Magnetic field sensors (e.g., rotation detectors) for detecting ferromagnetic articles and/or magnetic articles are known. The magnetic field associated with the ferromagnetic article or magnetic article is detected by a magnetic field sensing element, such as a Hall element or a magnetoresistance element, which provides a signal (i.e., a magnetic field signal) proportional to a detected magnetic field. In some arrangements, the magnetic field signal is an electrical signal.

The magnetic field sensor processes the magnetic field signal to generate an output signal that changes state each time the magnetic field signal crosses thresholds, either near to peaks (positive and/or negative peaks) or near to some other level, for example, zero crossings of the magnetic field signal. Therefore, the output signal has an edge rate or period indicative of a speed of rotation of the ferromagnetic or magnetic object, for example, a gear or a ring magnet.

One application for a magnetic field sensor is to detect the approach and retreat of each tooth of a rotating ferromagnetic gear, either a hard magnetic gear or a soft ferromagnetic gear. In some particular arrangements, a ring magnet having magnetic regions (permanent or hard magnetic material) with alternating polarity is coupled to the ferromagnetic gear or is used by itself and the magnetic field sensor is responsive to approach and retreat of the magnetic regions of the ring magnet. In other arrangements, a gear is disposed proximate to a stationary magnet and the magnetic field sensor is responsive to perturbations of a magnetic field as the gear rotates.

In one type of magnetic field sensor, sometimes referred to as a peak-to-peak percentage detector (or threshold detector), one or more threshold levels are equal to respective percentages of the peak-to-peak magnetic field signal. One such peak-to-peak percentage detector is described in U.S. Pat. No. 5,917,320 entitled "Detection of Passing Magnetic Articles While Periodically Adapting Detection Threshold" and assigned to the assignee of the present invention.

Another type of magnetic field sensor, sometimes referred to as a slope-activated detector (or peak-referenced detector, or peak detector for short), is described in U.S. Pat. No. 6,091,239 entitled "Detection Of Passing Magnetic Articles With a Peak Referenced Threshold Detector," also assigned to the assignee of the present invention. In the peak-referenced magnetic field sensor, the threshold signal differs from the positive and negative peaks (i.e., the peaks and valleys) of the magnetic field signal by a predetermined amount. Thus, in this type of magnetic field sensor, the output signal changes state when the magnetic field signal comes away from a peak or valley of the magnetic field signal by the predetermined amount.

It should be understood that, because the above-described threshold detector and the above-described peak detector both have circuitry that can identify the positive and negative peaks of a magnetic field signal, the threshold detector and the peak detector both include a circuit portion referred to as a "peak identifier" herein, which is configured to detect positive peaks and/or negative peaks of the magnetic field signal. The threshold detector and the peak detector, however, each use the detected peaks in different ways to provide a so-called "threshold generator," which is configured to use the identified peaks to generate one or more thresholds against which the magnetic field signal can be compared. This comparison can result in a so-called "PosComp" signal that has an edge rate representative of a speed of movement, e.g., rotation, of the moving object.

In order to accurately detect the positive and negative peaks of a magnetic field signal, in some embodiments, the rotation detector can be capable of tracking at least part of the magnetic field signal. To this end, typically, one or more digital-to-analog converters (DACs) can be used to generate a tracking signal, which tracks the magnetic field signal. For example, in the above-referenced U.S. Pat. Nos. 5,917,320 and 6,091,239, two DACs are used, one (PDAC) to detect the positive peaks of the magnetic field signal and the other (NDAC) to detect the negative peaks of the magnetic field signal.

Some types of rotation detectors perform one or more types of initialization or calibration, for example, at a time near to start up or power up of the rotation detector, or otherwise, from time to time as desired. During one type of calibration, the above-described threshold level is determined.

Once the above-described threshold level is initially determined, various schemes may be used for updating the threshold level to ensure that the threshold level remains at the desired relationship with respect to the peak-to-peak magnetic field signal level. For example, as described in U.S. Pat. No. 6,525,531 entitled "Detection of Passing Magnetic Articles while Adapting the Detection Threshold" and assigned to the assignee of the subject invention, the positive and negative detected peak signals (PDAC and NDAC, respectively) freely track "outwardly" to follow the magnetic field signal as it increases above PDAC and decreases below NDAC, respectively, following which such detected peak signals are selectively allowed to move "inward" (i.e., PDAC decreases and NDAC increases) to the level of the magnetic field signal upon transitions of the PosComp signal. Such threshold signal updating may be performed following an initial calibration mode, such as during a "running mode" of operation.

Many types of magnetic field sensors do not provide an accurate output signal (e.g., indication of absolute angle, speed, or direction of rotation) immediately upon power up, upon movement of the target object from zero rotating speed, and/or upon movement slowing to zero rotating speed, but instead provide an accurate output signal only once the target object has moved through a substantial rotation or is moving with substantial speed. For example, in one type of magnetic field sensor described in U.S. Pat. No. 6,525,531, entitled "Detection of Passing Magnetic Articles while Adapting the Detection Threshold," issued Feb. 25, 2003, a positive digital-to-analog converter (PDAC) and a negative digital-to-analog converter (NDAC) track positive and negative peaks of a magnetic field signal, respectively, for use in generating a threshold signal. A varying magnetic field signal (an electrical signal responsive to a magnetic field) is compared to the threshold signal. However, the outputs of the PDAC and the NDAC may not be accurate indications of the positive and negative peaks of the magnetic field signal until several cycles of the signal (i.e., signal peaks) occur (i.e., until several gear teeth have passed). This type of magnetic field sensor, which generally requires time to become fully accurate, is referred to herein as a so-called "precision rotation detector."

In contrast, a "true power on state" (TPOS) detector can provide a reasonably accurate output signal shortly after movement of a target object (e.g., camshaft) from zero rotating speed, or a low rotation speed in some applications of for example less than 100 rpm, or also shortly before movement slowing to zero rotating speed. Furthermore, even when the target object is not moving, the TPOS detector can provide an indication of whether the TPOS detector is in front of a tooth or a valley of a gear. However, when the target object is stationary, the conventional TPOS detector is not able to identify an absolute or relative angle of rotation of the target object. The TPOS detector can be used in conjunction with a precision rotation detector within a common integrated circuit, each providing information to the engine control processor at different times. For simplicity, TPOS detectors and precision rotation detectors are shown herein within a common integrated circuit. However, the TPOS detector or the precision rotation detector can also be used alone in separate circuits.

The TPOS detector can be a so-called "tooth detector," able to differentiate a tooth from a valley when the gear is not rotation. The precision rotation detector can be a so-called "edge detector," able to detect edges of gear teeth as they pass by, or the precision rotation detector can be a tooth-detector.

Some moving objects, for example, rotating moving objects, which are sensed by the above-described magnetic field sensors, exhibit irregular motions or have irregular features. For example, a gear may have wobble as it rotates, it may have run out (asymmetry about its axis of rotation), or it may have irregularities in its mechanical dimensions, for example, some gear teeth may be wider than others. These irregularities tend to result in generation of thresholds that are not ideal. The non-ideal threshold tends to result in a PosComp signal that has edges that are not accurately placed relative to cycles of the magnetic field signal associated with the moving object.

It would, therefore, be desirable to provide a magnetic field sensor that can accurately identify threshold levels associated with a magnetic field signal, accurate even in the presence of irregularities in the motion of, or in the mechanical characteristics of, the moving object being sensed. It would also be desirable to provide a magnetic field sensor that can accurately identify threshold level for a magnetic field signal associated with a rotating object having a number of detectable features selected from a set of possible numbers of detectable features.

SUMMARY OF THE INVENTION

The present invention provides a magnetic field sensor that can accurately identify a threshold level associated with a magnetic field signal, accurate even in the presence of irregularities in the motion of, or in the mechanical characteristics of, the moving object being sensed. The present invention also provides a magnetic field sensor that can accurately identify threshold level for a magnetic field signal associated with a rotating object having a number of detectable features selected from a set of possible numbers of detectable features.

In accordance with an example useful for understanding an aspect of the present invention, a magnetic field sensor is for detecting a movement of an object, wherein the object has a plurality of object features, wherein a quantity of the object features belongs to a set of possible quantities of object features, wherein the set has a least common multiple of possible quantities of object features. The magnetic field sensor includes a magnetic field sensing element for generating a magnetic field signal responsive to the object features as they pass by the magnetic field sensing element. The magnetic field signal comprises a plurality of magnetic field signal cycles, wherein each one of the plurality of magnetic field signal cycles is indicative of a respective one of the plurality of object features passing by the magnetic field sensing element, wherein the plurality of magnetic field signal cycles includes a present magnetic field signal cycle and a plurality of past magnetic field signal cycles. The magnetic field sensor also includes a motion detector coupled to the magnetic field sensing element and configured to generate a motion signal indicative of the movement of the object, wherein the motion signal has a plurality of rising edges and a plurality of falling edges, wherein each rising edge and each falling edge is associated with a respective one of the plurality of magnetic field signal cycles. The motion detector includes a peak identifying circuit for identifying at least one of a plurality of positive peaks of the magnetic field signal or a plurality of negative peaks of the magnetic field signal to provide a peak signal indicative of the at least one of the plurality of positive peaks of the magnetic field signal or of the plurality of negative peak of the magnetic field signal. The motion detector also includes a sample selection circuit module coupled to receive a peak-related signal related to the peak signal and configured to store a plurality of samples of the peak-related signal. The sample selection circuit module is further configured to sequentially recall stored samples of the peak-related signal from the stored plurality of samples to generate a sampled signal. Each sequentially selected stored sample within the sampled signal is associated with a respective one of the plurality of prior cycles of the magnetic field signal that occurred a quantity of prior cycles ago equal to an integer multiple of the least common multiple of the possible quantities of the object features. The motion detector also includes a comparator coupled to receive a signal related to the sampled signal, coupled to receive the magnetic field signal, and configured to compare the signal related to the sampled signal with the magnetic field signal in order to generate the motion signal.

In some embodiments, the above magnetic field sensor can include one or more of the following aspects in any combination.

In some embodiments of the above magnetic field sensor, the least common multiple is twelve.

In some embodiments, the above magnetic field sensor further comprises:

a threshold generator coupled to receive the sampled signal and configured to use the sampled signal to generate the signal related to the sampled signal as a threshold signal a predetermined percentage of a difference between the plurality of positive peaks of the magnetic field signal and selected ones of the plurality of negative peaks of the magnetic field signal.

In some embodiments of the above magnetic field sensor, the stored peak signal is indicative of the at least one of the plurality of positive peaks of the magnetic field signal, and the magnetic field sensor further comprises:

a threshold generator coupled to receive the sampled signal and configured to use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

In some embodiments of the above magnetic field sensor, the stored peak signal is indicative of the at least one of the plurality of negative peaks of the magnetic field signal, and the magnetic field sensor further comprises:

a threshold generator coupled to receive the sampled signal and configured to use the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

In some embodiments, the above magnetic field sensor further comprises:

a threshold generator coupled to receive the peak signal and configured to generate the peak-related signal as a threshold signal, wherein the threshold signal comprises values between respective ones of the plurality of positive peaks of the magnetic field signal and selected ones of the plurality of negative peaks of the magnetic field signal.

In some embodiments of the above magnetic field sensor, the sampled signal is one of a plurality of sampled signals, wherein each sampled signal is associated with a different respective one of the plurality of prior cycles of the magnetic field signal, each occurring a quantity of prior cycles ago equal to a different integer multiple of the least common multiple of the possible quantities of the object features, wherein the motion detector further comprises:

a function processor configured to combine selected ones of the samples within the plurality of sampled signals to generate the signal related to the sampled signal as a combined signal.

In some embodiments of the above magnetic field sensor, the function processor configured to average the selected ones of the samples within the plurality of sampled signals to generate the sampled signal as an averaged signal.

In some embodiments, the above magnetic field sensor further comprises:

a threshold generator coupled to receive the combined signal and configured to use the combined signal to generate the signal related to the sampled signal as a threshold signal a predetermined percentage of a difference between the plurality of positive peaks of the magnetic field signal and selected ones of the plurality of negative peaks of the magnetic field signal.

In some embodiments of the above magnetic field sensor, the stored peak signal is indicative of the at least one of the plurality of positive peaks of the magnetic field signal, and the magnetic field sensor further comprises:

a threshold generator coupled to receive the sampled signal and configured to use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

In some embodiments of the above magnetic field sensor, the stored peak signal is indicative of the at least one of the plurality of negative peaks of the magnetic field signal, and the magnetic field sensor further comprises:

a threshold generator coupled to receive the sampled signal and configured to use the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

In some embodiments of the above magnetic field sensor, the function processor configured to average the selected ones of the samples within the plurality of sampled signals to generate the sampled signal as an averaged signal.

In some embodiments, the above magnetic field sensor further comprises:

a threshold generator coupled to receive the peak signal and configured to generate the peak-related signal as a threshold signal, wherein the threshold signal comprises values between respective ones of the plurality of positive peaks of the magnetic field signal and selected ones of the plurality of negative peaks of the magnetic field signal.

In some embodiments of the above magnetic field sensor, the function processor is configured to average the selected ones of the samples within the plurality of sampled signals to generate the sampled signal as an averaged signal.

In some embodiments, the above magnetic field sensor further comprises an error processor coupled to receive the peak-related signal and coupled to receive the sampled signal, wherein:

if a value of the peak-related signal and a value of the sampled signal differ by more than a predetermined amount, the error processor is configured to generate an error signal having a predetermined state indicative of an error condition.

In some embodiments, the above magnetic field sensor further comprises an adjustment processor coupled to receive the error signal, and in response to the error condition, the sample selection circuit module is configured to provide the peak-related signal as the sampled signal.

In some embodiments, the above magnetic field sensor further comprises:

an adjustment processor coupled to receive the error signal, and in response to the error condition, the sample selection circuit module is configured to change a value of the least common multiple.

In some embodiments, the above magnetic field sensor further comprises:

an object feature quantity detection processor configured to receive the motion signal and configured to calculate a quantity of object features value indicative of the quantity of object features upon the object, wherein the sample selection circuit module is configured to change a value of the least common multiple in accordance with the quantity of object features value.

In accordance with another example useful for understanding another aspect of the present invention, a method is for detecting a movement of an object, wherein the object has a plurality of object features, wherein a quantity of the object features belongs to a set of possible quantities of object features, wherein the set has a least common multiple of possible quantities of object features. The method includes generating a magnetic field signal proportional to a magnetic field associated with the object, wherein the magnetic field signal comprises a plurality of magnetic field signal cycles. Each one of the plurality of magnetic field signal cycles is indicative of a respective one of the plurality of object features passing by the magnetic field sensing element. The plurality of magnetic field signal cycles includes a present magnetic field signal cycle and a plurality of past magnetic field signal cycles. The method also includes generating a motion signal indicative of the movement of the object, wherein the motion signal has a plurality of rising edges and a plurality of falling edges. Each rising edge and each falling edge is associated with a respective one of the plurality of magnetic field signal cycles. The generating the motion signal includes identifying at least one of a plurality of positive peaks of the magnetic field signal or a plurality of negative peaks of the magnetic field signal to provide a peak signal indicative of the at least one of the plurality of positive peaks of the magnetic field signal or of the plurality of negative peak of the magnetic field signal. The generating the motion signal also includes storing a plurality of samples of the peak-related signal. The generating the motion signal also includes sequentially recalling stored samples of the peak-related signal from the stored plurality of samples to generate a sampled signal. Each sequentially selected stored sample within the sampled signal is associated with a respective one of the plurality of prior cycles of the magnetic field signal that occurred a quantity of prior cycles ago equal to an integer multiple of the least common multiple of the possible quantities of the object features. The generating the motion signal also includes comparing the signal related to the sampled signal with the magnetic field signal in order to generate the motion signal.

In some embodiments, the above method can include one or more of the following aspects in any combination.

In some embodiments of the above method, the least common multiple is twelve.

In some embodiments, the above method further comprises:

using the sampled signal to generate the signal related to the sampled signal as a threshold signal a predetermined percentage of a difference between the plurality of positive peaks of the magnetic field signal and selected ones of the plurality of negative peaks of the magnetic field signal.

In some embodiments of the above method, the stored peak signal is indicative of the at least one of the plurality of positive peaks of the magnetic field signal, and the magnetic field sensor further comprises:

using use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

In some embodiments of the above method, the stored peak signal is indicative of the at least one of the plurality of negative peaks of the magnetic field signal, and the method further comprises:

using the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

In some embodiments, the above method further comprises:

generating the peak-related signal as a threshold signal, wherein the threshold signal comprises values between respective ones of the plurality of positive peaks of the magnetic field signal and selected ones of the plurality of negative peaks of the magnetic field signal.

In some embodiments of the above method, the sampled signal is one of a plurality of sampled signals, wherein each sampled signal is associated with a different respective one of the plurality of prior cycles of the magnetic field signal, each occurring a quantity of prior cycles ago equal to a different integer multiple of the least common multiple of the possible quantities of the object features, and the method further comprises:

combining selected ones of the samples within the plurality of sampled signals to generate the signal related to the sampled signal as a combined signal.

In some embodiments of the above method, the combining comprises averaging the selected ones of the samples within the plurality of sampled signals to generate the sampled signal as an averaged signal.

In some embodiments, the above method further comprises:

using the combined signal to generate the signal related to the sampled signal as a threshold signal a predetermined percentage of a difference between the plurality of positive peaks of the magnetic field signal and selected ones of the plurality of negative peaks of the magnetic field signal.

In some embodiments of the above method, the stored peak signal is indicative of the at least one of the plurality of positive peaks of the magnetic field signal, and the magnetic field sensor further comprises:

using use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

In some embodiments of the above method, the stored peak signal is indicative of the at least one of the plurality of negative peaks of the magnetic field signal, and the method further comprises:

using the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

In some embodiments of the above method, the combining comprises averaging the selected ones of the samples within the plurality of sampled signals to generate the sampled signal as an averaged signal.

In some embodiments, the above method further comprises:

generating the peak-related signal as a threshold signal, wherein the threshold signal comprises values between respective ones of the plurality of positive peaks of the magnetic field signal and adjacent respective ones of the plurality of negative peaks of the magnetic field signal.

In some embodiments of the above method, the combining comprises averaging the selected ones of the samples within the plurality of sampled signals to generate the sampled signal as an averaged signal.

In some embodiments, the above method further comprises:

if a value of the peak-related signal and a value of the sampled signal differ by more than a predetermined amount, generating an error signal having a predetermined state indicative of an error condition.

In some embodiments, the above method further comprises:

in response to the error condition, providing the peak-related signal as the sampled signal.

In some embodiments, the above method further comprises:

in response to the error condition, changing a value of the least common multiple.

In some embodiments, the above method further comprises:

calculating a quantity of object features value indicative of the quantity of object features upon the object; and changing a value of the least common multiple in accordance with the quantity of object features value.

BRIEF DESCRIPTION OF THE DRAWINGS

The foregoing features of the invention, as well as the invention itself may be more fully understood from the following detailed description of the drawings, in which:

FIG. 17 is a graph showing cycles of a DIFF signal in the magnetic field sensors above.

DETAILED DESCRIPTION OF THE INVENTION

Figure 1:
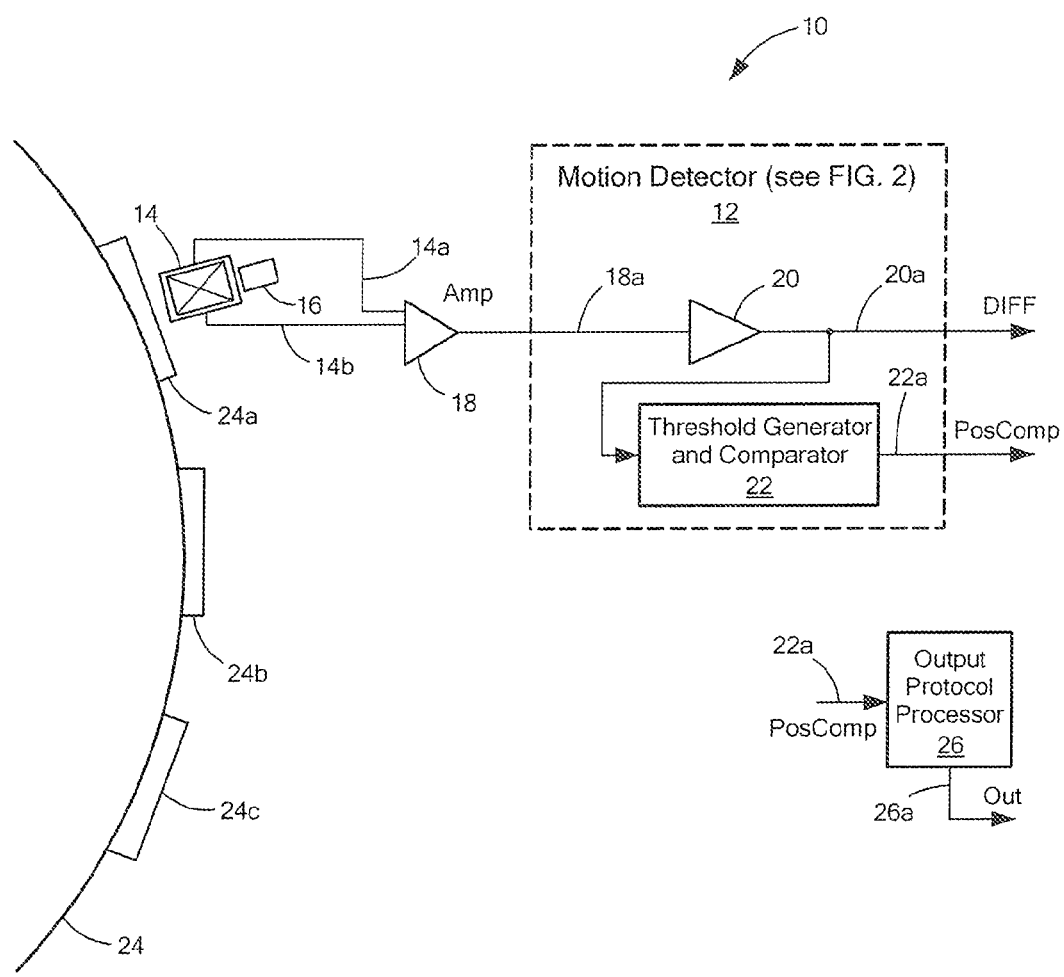
FIG. 1 is block diagram showing an exemplary magnetic field sensor in the form of a rotation sensor, having a motion detector with a threshold generator and comparator circuit.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "magnetic field signal" is used to describe any electrical (or optical) signal that is responsive to a magnetic field. A difference (DIFF) signal described below is one such magnetic field signal.

Threshold detectors and peak detectors are described above. As used herein, the term "tracking circuit" is used to describe a circuit that can track and perhaps hold a signal representative of a positive peak or a negative peak (or both) of a magnetic field signal. It should be understood that both a threshold detector and a peak detector can both employ a tracking circuit.

As used herein, the term "threshold identifier circuit" is used to describe a circuit portion configured to generate a threshold signal.

As used herein, the term "threshold generator circuit" is used to describe any circuit configured to generate a threshold, including, but not limited to a threshold detector or a peak detector. A threshold generator circuit can include both a tracking circuit and a threshold identifier circuit.

As used herein, the term "comparator" is used to describe any circuit capable of comparing two or more signals, which can be analog or digital signals. Thus, a comparator can be, but is not limited to, an analog comparator configured to compare analog signals, a digital comparator configured to compare digital signals, or a programmable device, for example, a microprocessor having code therein for comparing two digital signals.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

While circuits are shown below that use threshold detectors, in other embodiments, similar circuits can use peak detectors. Also, while circuits are shown below that use rotation detectors, in some embodiments, the rotations detectors can be motion detectors configured to detect other motions of an object, for example, repetitive linear motions.

Operation of a magnetic field sensor in a so-called "calibration mode," also referred to herein as an "initialization mode," is described herein. Reference is also made herein to operation of a magnetic field sensor in a so-called "running mode." The calibration mode can occur at the beginning of operation (or from time to time as desired) and the running mode is achieved at other times. Operation of the running mode is described in greater detail in one or more of the above-mentioned patents, notably, U.S. Pat. No. 5,917,320 and U.S. patent application Ser. No. 11/333,522, which are incorporated by reference herein in their entirety.

In general, during the calibration mode, an output signal from the magnetic field sensor may not be accurate, and during the running mode, the output signal is considered to be accurate, i.e., it has edges properly aligned with features of the magnetic field signal.

While a calibration time period is discussed herein, an end of which ends the calibration mode discussed herein in accordance with certain criteria, it should be recognized that other calibrations can be performed after the end of the indicated calibration time period. For example, an automatic gain control can continue calibrating after the end of the indicated calibration time period. At some point after the end of the indicated calibration time period, but not necessarily coincident with the end of the indicated calibration time period, the magnetic field sensors described herein can enter the running mode, during which updates to values of circuit parameters can update in a different way than during the calibration mode.

Referring now to FIG. 1, an exemplary magnetic field sensor 10 includes a magnetic field sensing element 14 for generating a signal 14a, 14b (i.e., a magnetic field signal) proportional to a magnetic field associated with an object 24. The magnetic field sensing element 14 can be, but is not limited to, a Hall Effect element, a magnetoresistance element, or a magnetotransistor.

It should be understood that the object 24 need not be a part of the magnetic field sensor 10. The object 24 can be an object configured to rotate, for example, a ferromagnetic gear. The magnetic field sensor 10 can include a permanent magnet 16 disposed proximate to the magnetic field sensing element 14.

The magnetic field sensor 10 can include an amplifier 18 coupled to receive the signal 14a, 14b from the magnetic field sensing element 14 and configured to generate a signal 18a (also a magnetic field signal).

The magnetic field sensor 10 can also include a motion detector, here a rotation detector 12, having an amplifier 20 coupled to receive the signal 18a and configured to generate a signal 20a, also referred to herein as a difference (DIFF) signal, representative of the signal 18a. In some embodiments, the amplifier 20 is an automatic gain control (AGC) amplifier. The DIFF signal 20a is also referred to herein as a magnetic field signal. Thus, the signals 14a, 14b, 18a, and 20a are all magnetic field signals, and are all indicative of a magnetic field experienced by the magnetic field sensing element 14.

The rotation detector 12 can include a threshold generator and comparator circuit 22 coupled to receive the DIFF signal 20a and configured to generate a PosComp "motion signal" 22a indicative of a movement (i.e., rotation) of the object 24. In some embodiments described more fully below, the motion signal 22a is a two state square wave having a frequency proportional to a speed of rotation of the object 24.

In some arrangements, the magnetic field sensing element 14 can be responsive to motion of the object 24, for example, motion of ferromagnetic gear teeth upon a gear, of which gear teeth 24a-24c upon a gear 24 are representative. To this end, the fixed magnet 16 can be disposed proximate to the magnetic field sensing element 14 and the gear teeth can disturb the magnetic field generated by the magnet 16 as the gear rotates. However, in other arrangements, the magnetic field sensing element 14 can be responsive to movement of magnetic regions upon a magnet, for example, magnetic regions upon a ring magnet (not shown) that is coupled to the gear 24. In some particular arrangements, the ring magnet and the gear 24 are coupled together with a shaft or the like. In these particular arrangements, the ring magnet can be proximate to the magnetic field sensing element 14, but the gear 24 need not be proximate to the magnetic field sensing element 14.

The magnetic field sensing element 14 is responsive to proximity of the gear teeth 24a-24c. In operation, the magnetic field sensing element 14 produces the magnetic field signal 14a, 14b (and also the magnetic field signals 18a, 20a) having a generally sinusoidal shape when the gear 24 rotates, wherein each peak (positive and negative) of the sinusoid is associated with one of the gear teeth 24a-24c.

The magnetic field sensor 10 can also include an output protocol processor 26 coupled to receive the PosComp motion signal 22a and configured to generate an output signal 26a representative of the speed of rotation of the object 24. In some embodiments, the output signal 26a is a two state square wave having a frequency proportional to the speed of rotation of the object 24. In other embodiments, the output signal 26a comprises digital words representative of the speed of rotation of the object 24.

Figure 1A:
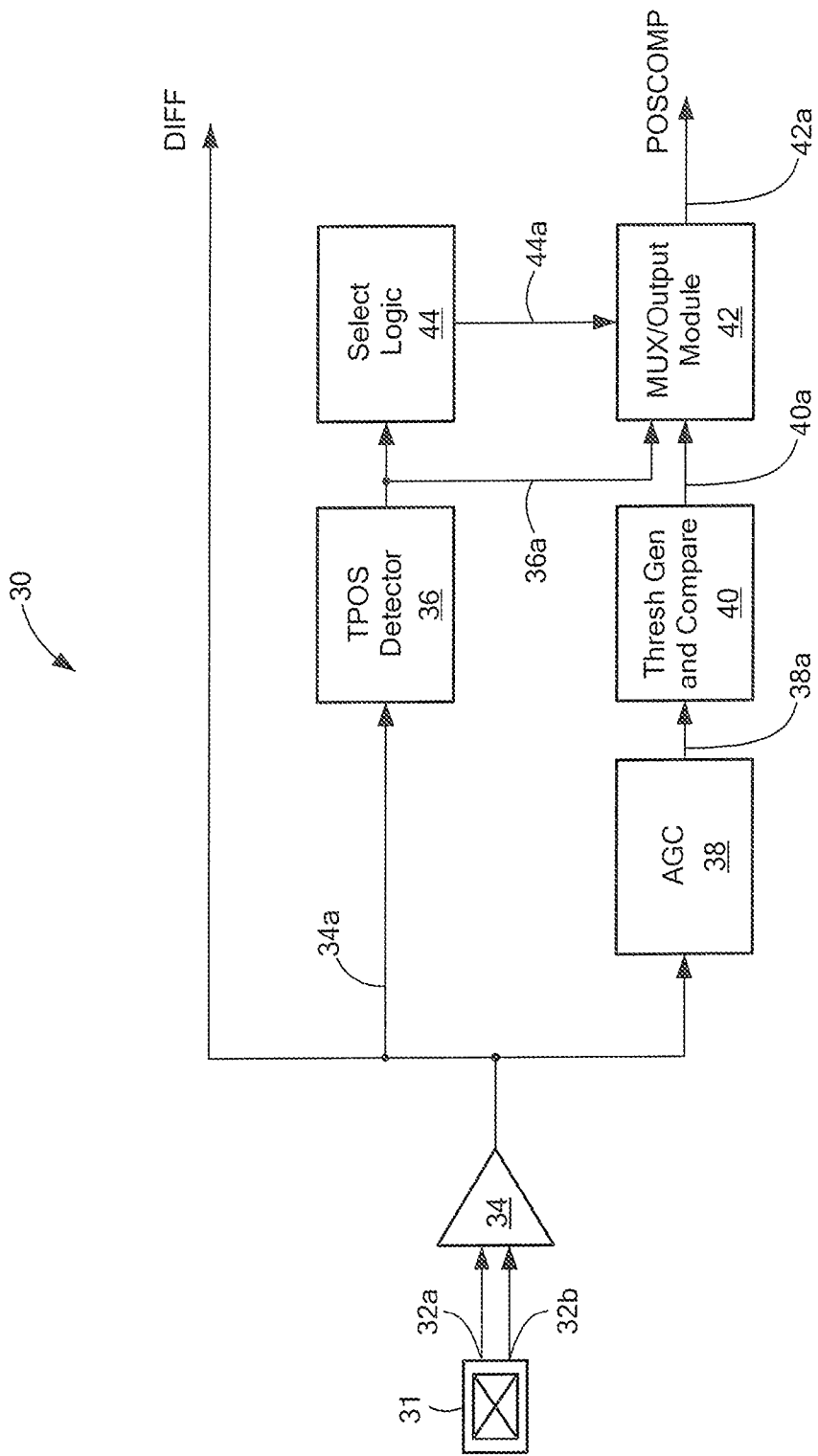
FIG. 1A is a block diagram showing another exemplary magnetic field sensor in the form of a rotation sensor, having two channels, a true power on state (TPOS) channel and a high precision channel.

Referring now to FIG. 1A, another exemplary magnetic field sensor 30 can include an amplifier 34 coupled to receive a differential signal 32a, 32b from a magnetic field sensing element 31. The differential signal 32a, 32b can be the same as or similar to the differential signal 14a, 14b generated by the magnetic field sensing element 14 of FIG. 1. The amplifier 34 is configured to generate an amplified signal 34a, which, in some embodiments, can split into two channels, a TPOS detector channel and a precision rotation detector channel.

In the true power on state (TPOS) channel, a TPOS detector 36 can be coupled to receive the amplified signal 34a and configured to generate a TPOS output signal 36a. In some embodiments, the TPOS detector 36 can include a comparator (not shown) configured to compare the amplified signal 34a with a fixed (and trimmed) threshold. In these embodiments, the TPOS output signal 36a can be a two-state binary signal for which a high state is indicative of a gear tooth being proximate to the magnetic field sensor 10 of FIG. 1 and a low state is indicative of a gear valley being proximate to the magnetic field sensor 10, or vice versa.

In the precision rotation detector channel, an automatic gain control (AGC) 38 can be coupled to receive the amplified signal 34a and configured to generate a gain controlled signal 38a. A threshold generator and comparator 40 (also referred to herein as a precision rotation detector) can be coupled to receive the gain controlled signal 38a and configured to generate a precision rotation detector output signal 40a. Like the TPOS output signal 36a, the precision rotation detector output signal 40a can be a two-state binary signal for which a high state is indicative of a gear tooth being proximate to the magnetic field sensor 10 of FIG. 1 and a low state is indicative of a gear valley being proximate to the magnetic field sensor 10, or vice versa.

In some embodiments, both the TPOS detector 36 and the precision rotation detector 40 can be "tooth detectors." However, it should be understood that the precision rotation detector channel uses the AGC 38, which, when the gear 22 is not rotating, may be at an undesirable gain, resulting, once the gear 22 starts to rotate, in a period of time during which the gain is incorrect and the precision rotation detector is not fully accurate. Even if the AGC 38 were not used, still the precision rotation detector 40 uses internal thresholds that are properly updated only when the gear 22 is rotating. However, in other embodiments, the threshold can be supplied from outside of the electronic circuit 30.

In some alternate embodiments, the precision rotation detector 40 can be an "edge detector," which is unable to identify whether the magnetic field sensor 10 is proximate to a gear tooth or a gear valley, particularly when the gear is not moving, but which is able to sense edges of gear teeth as they move past the magnetic field sensor 10.

Precision rotation detectors, e.g., the precision rotation detector 40, can have a variety of configurations. Some configurations are described in the above mentioned U.S. Pat. No. 6,525,531. However, other forms of precision rotation detectors are also known, including some that have two or more magnetic field sensing elements.

In general, from discussion above, it will be appreciated that the TPOS output signal 36a is indicative of whether the magnetic field sensing element 14 is proximate to a gear tooth or a gear valley, even when the gear, e.g., the gear 24 of FIG. 1, is stationary. However, since the TPOS detector 36 uses a fixed threshold, in some embodiments, having limited adjustment at power up, variations in the edge placement in the TPOS output signal 36a will occur due to a variety of factors, including, but not limited to, temperature variations, and variations in the air gap between the magnetic field sensing element 14 and the gear 24, and wobble or other rotational irregularities of the gear 24.

Unlike the TPOS detector 36, which uses fixed thresholds, the precision rotation detector 40 continually makes adjustments of thresholds to provide the precision rotation detector output signal 40a with better accuracy of edge placements of the precision rotation detector output signal 40a relative to physical positions of gear teeth. As described above, in part, it is these adjustments that make the precision rotation detector less accurate when it is first powered up or when the gear 24 first starts to rotate.

In some embodiments, particularly embodiments for which the TPOS detector and the precision rotation detector 40 are integrated onto a common substrate, a multiplexer/output module 42 can be coupled to receive the TPOS output signal 36a and coupled to receive the precision rotation detector output signal 40a. Select logic 44 can provide a selection signal 44a, received by the multiplexer/output module 42. Depending upon the state of the selection signal 44a, the multiplexer/output module 42 is configured to generate an output signal 42a representative of a selected one of the TPOS output signal 36a or the precision rotation detector output signal 40a. The output signal 42a can be provided in a variety of signal formats, including, but not limited to, a SENT format, an I²C format, a PWM format, or a two-state format native to the TPOS output signal 36a and to the precision rotation detector output signal 40a.

In some exemplary embodiments, the select logic 44 selects the output signal 42a to be representative of the TPOS output signal 36a for a predetermined amount of time after the gear 22 starts rotating as indicated by the TPOS output signal 36a. Thereafter, the select logic 44 selects the output signal 42a to be representative of the precision rotation detector output signal 40a.

Figure 1B:
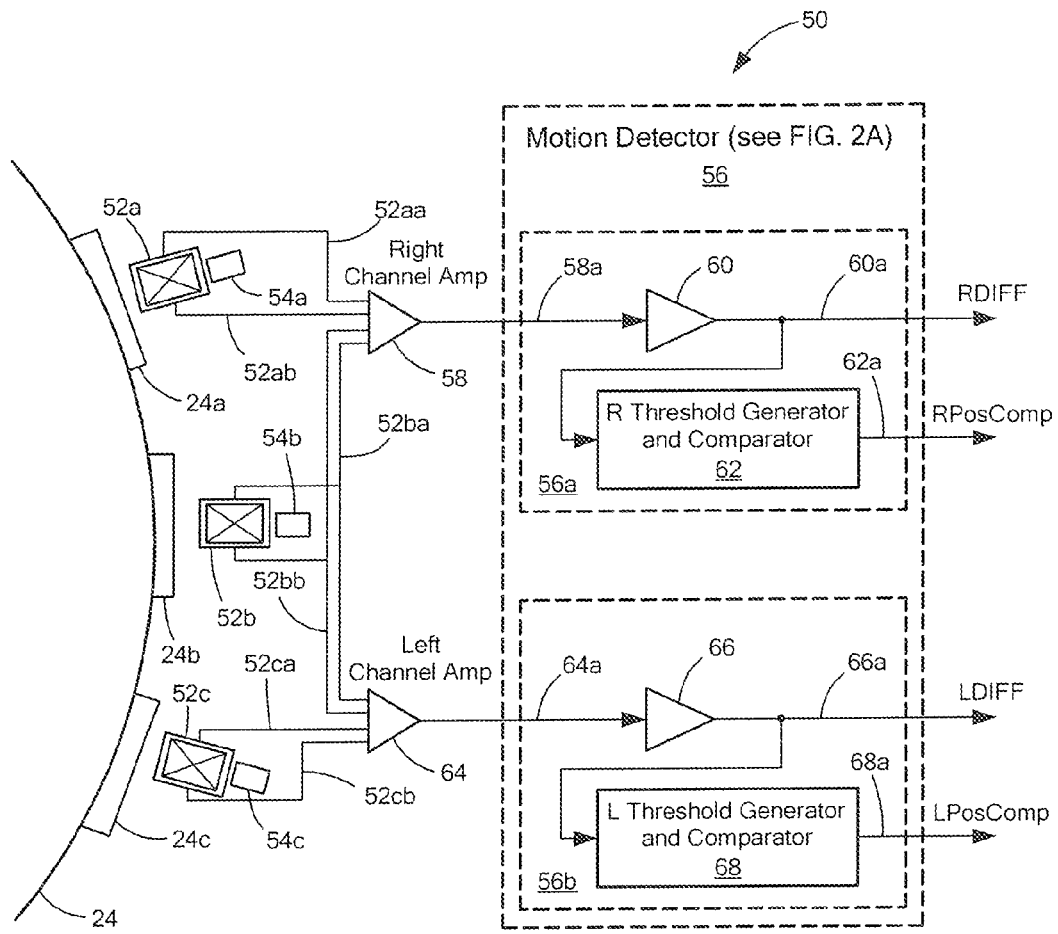
FIG. 1B is a block diagram showing another exemplary magnetic field sensor in the form of a rotation sensor, having two motion detectors with a respective two threshold generator and comparator circuits.
Figure 1B:
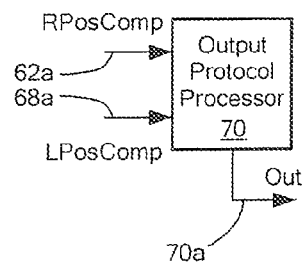

Referring now to FIG. 1B, in which like elements of FIG. 1 are shown having like reference designations, another exemplary magnetic field sensor 50 includes a plurality of magnetic field sensing elements 52a-52c for generating signals 52aa, 52ab, 52ba, 52bb, 52ca, 52cb (magnetic field signals) proportional to a magnetic field.

The magnetic field sensor 50 includes a right channel amplifier 58 coupled to the magnetic field sensing elements 52a and 52b and configured to generate a signal 58a (also a magnetic field signal). The magnetic field sensor 50 also includes a left channel amplifier 64 coupled to the magnetic field sensing elements 52b and 52c and configured to generate a signal 64a (also a magnetic field signal). The signal 58a is proportional to a magnetic field at a first location relative to the object 24 and the signal 64a is proportional to a magnetic field at a second location relative to the object 24. As described more fully below, the first and second locations are associated with right and left electronic channels, respectively.

The magnetic field sensor 50 also includes motion detectors, here rotation detectors 56, which includes right and left channel motion detectors, here rotation detectors 56a, 56b, respectively. The rotation detector 56a can include an amplifier 60 coupled to receive the signal 58a and configured to generate an RDIFF signal 60a (also a magnetic field signal) representative of the signal 58a. The rotation detector 56b can include an amplifier 66 coupled to receive the signal 64a and configured to generate an LDIFF signal 66a (also a magnetic field signal) representative of the signal 64a. In some embodiments, the amplifiers 60, 66 are automatic gain control (AGC) amplifiers.

The rotation detector 56a also includes a right channel threshold generator and comparator circuit 62 coupled to receive the RDIFF signal 60a and configured to generate an RPosComp motion signal 62a indicative of a movement (i.e., rotation) of the object 24. The rotation detector 56b also includes a left channel threshold generator and comparator circuit 68 coupled to receive the LDIFF signal 66a and configured to generate an LPosComp motion signal 68a indicative of the movement (i.e., rotation) of the object 24.

In some embodiments, the motion signals 62a, 68a are each two state square waves having a frequency proportional to the speed of rotation of the object 24. It will be understood that, since the magnetic field sensing elements 52a-52c are at different physical locations, the RPosComp signal 62a can have a different phase than the LPosComp signal 68a. Furthermore, if the object 24 rotates in one direction, the phase of the RPosComp 62a will lead the phase of the LPosComp signal 68a, but if the object 24 rotates in the opposite direction, the phase relationship will reverse. Therefore, the magnetic field sensor 50, unlike the magnetic field sensor 10 of FIG. 1, is able to generate signals representative not only of the speed of rotation of the object 24, but also signals representative of the direction of rotation of the object 24.

The above designations "left" and "right" (also L and R, respectively) are indicative of physical placement of the magnetic field sensors 52a-52c relative to the object 24 and correspond arbitrarily to left and right channels. In the illustrative embodiment, three magnetic field sensing elements 52a-52c are used for differential magnetic field sensing, with the central sensor 52b used in both channels. While three magnetic field sensors 52a-52c are shown, it should be appreciated that two or more magnetic field sensors can be used. For example, in an embodiment using only two magnetic field sensors 52a, 52c, only magnetic field sensor 52a can be coupled to the right channel amplifier 58 and only the magnetic field sensor 54c can be coupled to the left channel amplifier 64.

The magnetic field sensor 50 can also include an output protocol processor 70 coupled to receive the RPosComp signal 62a and the LPosComp signal 68a and configured to generate an output signal 70a representative of at least the speed (or direction) of rotation of the object 24. In some embodiments, the output signal 70a is also representative of the direction of rotation of the object 24.

In some embodiments the output signal 70a is a two state square wave having a frequency proportional to the speed of rotation of the object 24 and a duty cycle (or pulse width) representative of the direction of the rotation of the object 24. In other embodiments, the output signal 70a comprises digital words representative of the speed of rotation of the object 24 and the direction of rotation.

In some alternate embodiments, only two magnetic field sensing elements e.g., 52a, 52c are used to provide similar functionality.

Figure 2:
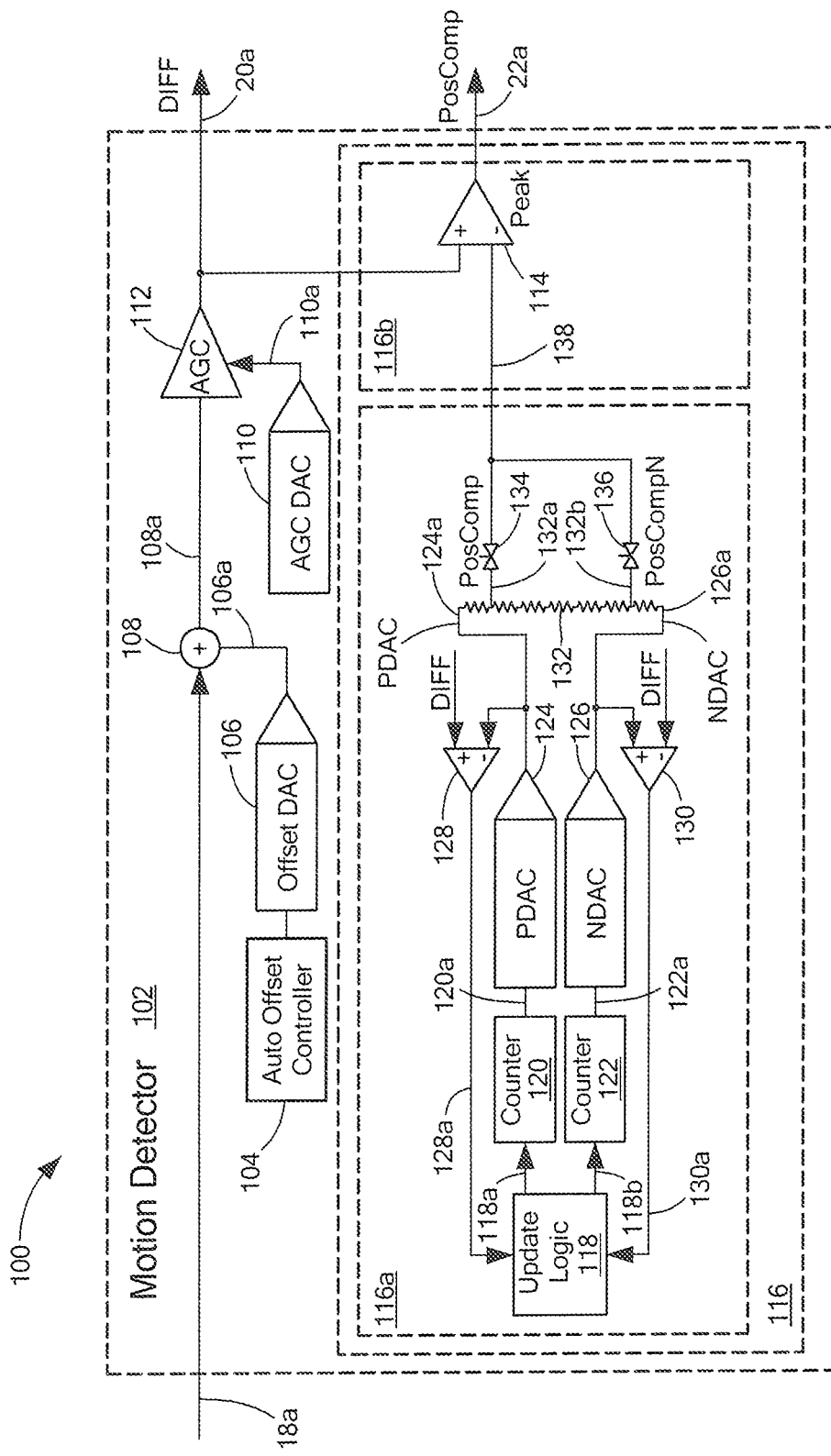
FIG. 2 is a block diagram showing an exemplary motion detector that can be used as the motion detector of FIG. 1, having two digital-to-analog converters (DACs), a positive DAC (PDAC) and a negative DAC (NDAC)

Referring now to FIG. 2, in which like elements of FIG. 1 are shown having like reference designations, a circuit 100 includes an exemplary rotation (motion) detector 102, which can be the same as or similar to the rotation detector 12 of FIG. 1, but shown in greater detail.

The rotation detector 102 is coupled to receive the magnetic field signal 18a of FIG. 1. The magnetic field signal 18a can include an undesirable DC offset. Therefore, an auto offset controller 104, an offset digital-to-analog converter (DAC) 106, and a summer 108 can be provided in order to reduce or eliminate the DC offset.

The rotation detector 102 can also include an automatic gain control (AGC) amplifier 112 coupled to receive an output signal 108a generated by the summer 108 and configured to generate the DIFF signal 20a having an amplitude within a controlled amplitude range. It should be understood that the DIFF signal 20a is representative of the magnetic field experienced by one or more magnetic field sensing elements, for example, the magnetic field sensing element 14 of FIG. 1.

The DIFF signal 20*a* is coupled to a comparator 114 (a comparator part 116*b* of the threshold generator and comparator circuit 116). The comparator 114 also receives a threshold signal 138. Generation of the threshold signal 138 is further described below. The threshold comparator 114 is configured to generate the PosComp signal 22*a*.

The threshold signal 138 can switch between two different values. In one particular embodiment, the threshold signal 138 can be determined by a threshold detector 116*a* (a threshold generator part 116*a* of the threshold generator and comparator circuit 116). A first threshold signal 132*a* can be a first predetermined percentage e.g., eighty-five percent, of a peak-to-peak magnitude of the DIFF signal 20*a*, e.g., near to but below a positive peak of the DIFF signal 20*a*. A second threshold signal 132*b* can be a second predetermined percentage, e.g., fifteen percent, of a peak-to-peak magnitude of the DIFF signal 20*a*, e.g., near to but above a negative peak of the DIFF signal 20*a*. The threshold signal 138 can, therefore, be relatively near to and below a positive peak of the DIFF signal 20*a* at some times and relatively near to and above a negative peak of the DIFF signal 20*a* at other times. Therefore, the comparator 114 can generate the PosComp signal 22*a* having edges closely associated with the positive and negative peaks of the DIFF signal 20*a*.

However, in other embodiments, the threshold signal 138 can take on two other different values, for example, two values near to zero crossings of the DIFF signal 20*a*, and therefore, the threshold comparator 114 can generate the PosComp signal 22*a* having edges closely associated with the zero crossings of the DIFF signal 20*a*. In still other embodiments, the threshold signal 138 can take on two other different values as may be generated, for example, by a peak detector, which is described above.

The threshold signal (or voltage) 138 is generated by the threshold generator and comparator circuit 116, which can be the same as or similar to the threshold generator and comparator circuit 22 of FIG. 1.

The threshold generator part 116*a* of the threshold generator and comparator circuit 116 can include counters 120, 122, a PDAC 124, an NDAC, 126, first and second comparators 128, 130, respectively, an update logic circuit 118, a resistor ladder 132, and first and second switches 134, 136, respectively. The PDAC 124 is coupled to receive a count signal 120*a* from the counter 120. The PDAC 124 is configured to generate a PDAC output signal 124*a* coupled to a first end of the resistor ladder 132. The NDAC 126 is coupled to receive a count signal 122*a* from the counter 122. The NDAC 126 is configured to generate an NDAC output signal 126*a* coupled to a second end of the resistor ladder 132. The PDAC output signal 124*a* and the NDAC output signal 126*a* are also referred to herein as tracking signals.

In operation, the PDAC output signal 124*a* can sometimes track the DIFF signal 20*a* and sometimes hold a positive peak of the DIFF signal 20*a* and the NDAC output signal 126*a* can sometimes track the DIFF signal 20*a* and sometimes hold a negative peak of the DIFF signal 20*a*.

The first switch 134 is coupled to receive a first threshold signal 132*a* signal from a first tap of the resistor ladder 132 and the second switch 136 is coupled to receive a second threshold signal 132*b* signal from a second tap of the resistor ladder 132. The first switch 134 can be controlled by the PosComp signal 22*a* and the second switch 136 can be controlled by an inverted PosComp signal 22*a*, i.e. a PosCompN signal.

The first comparator 128 is coupled to receive the PDAC signal 124*a* and also coupled to receive the DIFF signal 20*a* and configured to generate a first feedback signal. The second comparator 130 is coupled to receive the NDAC signal 126*a* and also coupled to receive the DIFF signal 20*a* and configured to generate a second feedback signal 130*a*.

In FIGS. 5-10 below, it will be shown that additional circuitry, namely, a threshold selection module, can be coupled between the threshold generator part 116*a* and the comparator part 116*b* of the threshold generator and comparator circuit 116.

Figure 2A:
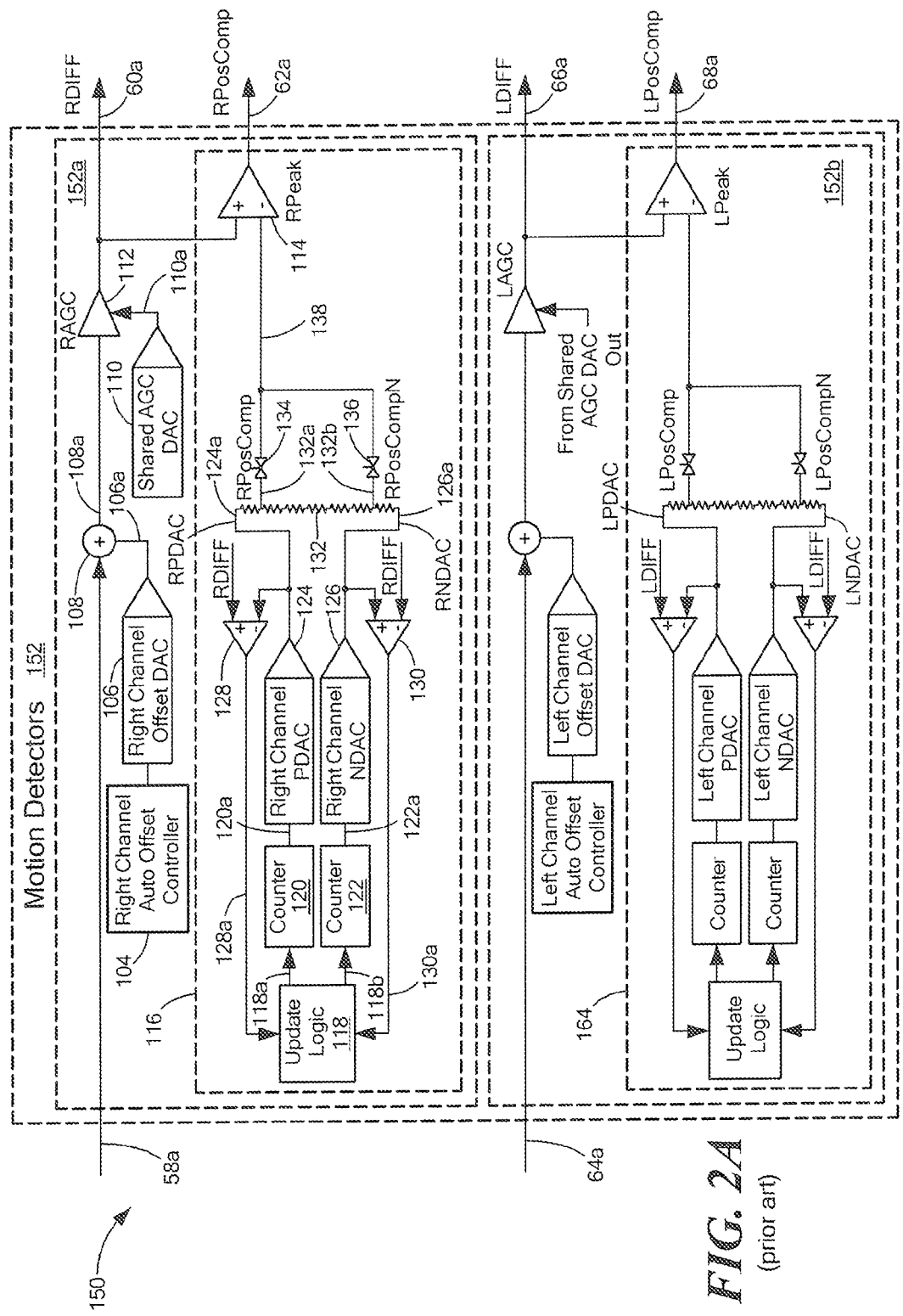
FIG. 2A is a block diagram showing two exemplary motion detectors that can be used as the two motion detectors of FIG. 1B, having two respective PDACs and two respective NDACs.

Referring now to FIG. 2A, in which like elements of FIGS. 1B and 2 are shown having like reference designations, a circuit 150 includes two exemplary rotation (motion) detectors 152, identified as 152*a*, 152*b*, which can be the same as or similar to the rotation detectors 56*a*, 56*b* of FIG. 1A, but shown in greater detail.

The rotation detectors 152 can include two threshold generator and comparator circuits 116, 164, which can be the same as or similar to the threshold generator and comparator circuit 62,68 of FIG. 1B, but shown in greater detail. The rotation detector 152*a* is coupled to receive the magnetic field signal 58*a* of FIG. 1B and the rotation detector 152*b* is coupled to receive the magnetic field signal 64*a* of FIG. 1B. The rotation detector 152*a* is configured to generate the RPosComp signal 62*a* (FIG. 1B) and the RDIFF signal 60*a* (FIG. 1B), and the rotation detector 152*b* is configured to generate the LPosComp signal 68*a* (FIG. 1B) and the LDIFF signal 66*a* (FIG. 1B).

Operation of each one of the two rotation detectors 152*a*, 152*b* is the same as or similar to operation of the rotation detector 102 of FIG. 2, so is not discussed here again.

Figure 2B:
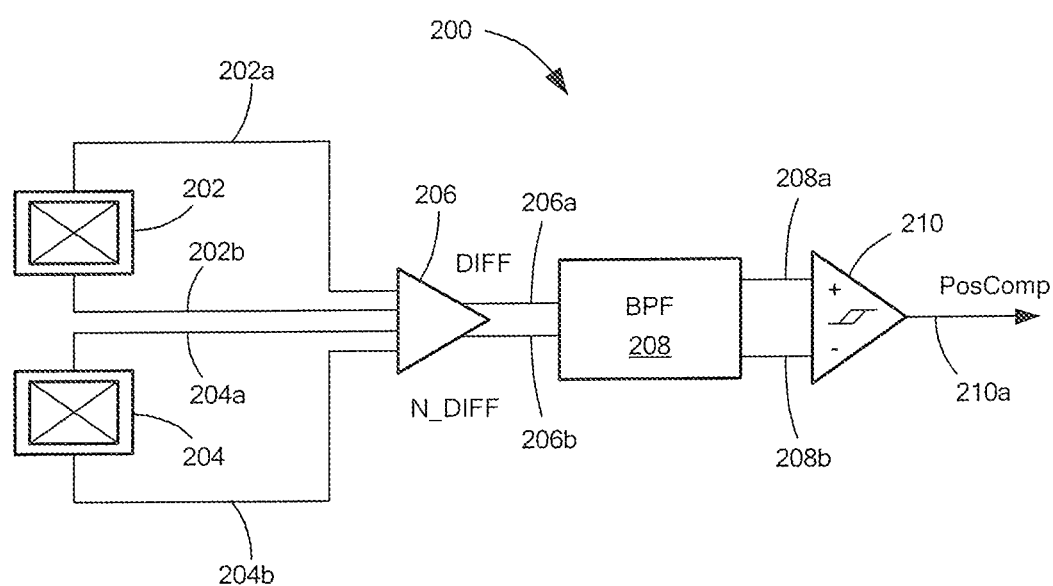
FIG. 2B is a block diagram of another exemplary magnetic field sensor in the form of a rotation sensor and having a zero crossing detector.

Referring now to FIG. 2B, a so-called "zero-crossing detector" 200, a threshold generator and comparator circuit, can be compared with the threshold generator and comparator circuit 116 of FIG. 2. Here, an amplifier 206 is coupled to receive signals 202*a*, 202*b*, 204*a*, 204*b* from two magnetic field sensing elements 202, 204. The amplifier is configured to generate a differential output signal 206*a*, 206*b* coupled to a band pass filter (BPF) 208. The differential signal 206*a*, 206*b* is comparable to a differential DIFF signal. The BPF 208 is configured to generate a differential filtered signal 208*a*, 208*b*. A comparator is coupled to receive the differential filtered signal 208*a*, 208*b* and configured to generate a motion signal, PosComp 210*a*.

In operation, the signals 208*a*, 208*b* essentially operate as thresholds. The signals 208*a*, 208*b* cross each other at or near a zero crossing of each respective signal 208*a*, 208*b*. From discussion below, it will be apparent how to use the zero-crossing detector in the embodiments of FIGS. 5 and 7.

Figure 3:
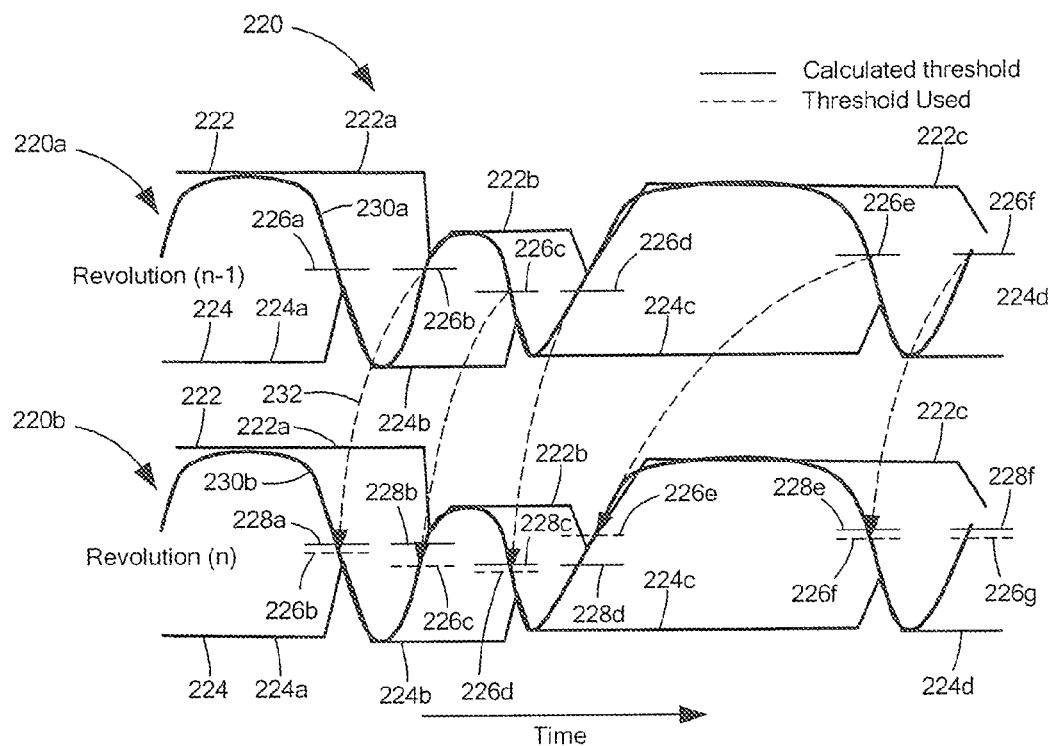
FIG. 3 is a graph showing two magnetic field signals, each at a different revolution of a moving object being sensed, with associated PDAC and NDAC output signals and associated thresholds.

Referring now to FIG. 3, a graph 220 includes two parts 220*a*, 220*b*, each part having a horizontal axis with a scale in arbitrary units of time, which can be related to rotation angle or linear displacement, and a vertical axis with a scale in arbitrary units of voltage, which can be related to magnetic field strength (Gauss) or an associated digital value.

Cycles of each one of the parts 220*a*, 220*b* are indicative of gear teeth, e.g., the gear teeth 24*a*-24*c* of FIG. 1B, passing by the magnetic field sensing elements, e.g., the magnetic field sensing elements 54*a*-54*c* of FIG. 1B. The parts 220*a*, 220*b* are each indicative of a different revolution, and at the same positions (rotational angles), of the gear 24 of FIG. 1.

The part 220*b* includes a DIFF signal 230*b* representative, for example, of the DIFF signal 20*a* of FIGS. 1 and 2. The DIFF signal 230*b* is representative of an nth revolution of the gear 24 of FIG. 1. In normal operation, a PDAC signal 222, which is similar to the PDAC signal 124*a* of FIG. 2, can reach and acquire positive peaks of the DIFF signal 230b. Similarly, an NDAC signal 224, which is similar to the NDAC signal 126a of FIG. 2, can reach and acquire negative peaks of the DIFF signal 230b.

The part 220a includes a DIFF signal 230a also representative, for example, of the DIFF signal 20a of FIGS. 1 and 2. The DIFF signal 230a is representative of an (n−1)st revolution, i.e., a prior revolution, of the gear 24 of FIG. 1. In normal operation, the PDAC signal 222 can reach and acquire positive peaks of the DIFF signal 230a. Similarly, an NDAC signal 224 can reach and acquire negative peaks of the DIFF signal 230a.

Thresholds 226a-226f can be calculated during cycles of the DIFF signal 230a on the (n−1)st revolution of the gear 24. Thresholds 228a-228f can be calculated during cycles of the DIFF signal 230b, but on the nth revolution of the gear 24. The thresholds 226a-226f correspond, for example, to threshold signals as may be taken from a center tap of the resistor ladder 132 of FIG. 2, i.e., a 50% point between the positive and negative peaks of the DIFF signal 230a on the (n−1)st revolution of the gear 24. The thresholds 228a-228f correspond, for example, to threshold signals as may be taken from the center tap of the resistor ladder 132 on the nth revolution of the gear 24. A center tap is shown in figures below.

Arrows, of which an arrow 232 is representative, indicate that during the nth revolution of the gear represented by the DIFF signal 230b, during which the thresholds 228a-228f could otherwise be used, instead, the thresholds 226a-226f are used. On an nth revolution of the gear 24, the threshold determined during an (n−1)st revolution is used, shifted by one edge. In other words, on the nth revolution, threshold 226b is used instead of threshold 228a, threshold 226c is used instead of threshold 228b, and so on. A threshold from a prior cycle is used, but the threshold is used that is associated with the next edge of the gear 24.

Similarly, on an (n+1)st revolution of the gear 24, for which a DIFF signal is not shown, the thresholds 228a-228f could be used. Thus, thresholds are used from a prior revolution of the gear 24.

It will be apparent that, on the nth revolution of the gear 24, while use of only thresholds from the (n−1)st revolution is shown, in other embodiments, any combination of thresholds from prior and present cycles and revolutions could be used. For example, in one embodiment, several prior thresholds associated with the same gear tooth as the present gear tooth now at the nth revolution can be averaged. For example, thresholds associated with the same gear tooth but at the (n−1)th, (n−2)th, . . . , (n−M)th revolutions can be averaged to provide a threshold to be used for the same gear tooth at the nth revolution.

In still other embodiments, prior thresholds associated with more than one gear tooth at the current, nth, revolution can be used. For example, thresholds associated with the different gear teeth (n−1)th, (n−2)th, . . . , (n−N)th gear teeth, all in the nth revolution can be averaged to provide a threshold to be used for a gear tooth at the nth revolution.

In still other embodiments, not only prior thresholds, but also the presently determined threshold can be used in either of the above two averages. Furthermore, while averages are discussed above, any combination of the thresholds can be used. The combinations can include, but are not limited to, RMS combinations and weighted averages.

In still other embodiments, any combination of present and prior thresholds from present and prior gear teeth and/or revolutions can be used.

Taking threshold 226d as an example, and only looking at revolution (n−1) 220a, it should be appreciated that the threshold 226d is calculated based upon the PDAC signal 222, taken during interval 222b, in relation to the NDAC signal 224, taken during the interval 224c. Thus, in fact, the threshold 226d, generated during revolution (n−1), would be best applied at the edge of the DIFF signal 230a where the threshold 226c is instead applied as shown. However, at that time, the threshold 226d has not yet been generated. In other words, each threshold generated during revolution (n−1) is actually most suitable for application to an edge (gear tooth) of the DIFF signal 230a prior to the edge (gear tooth) upon which it is actually applied.

Accordingly, by the above-described arrangement, on the next revolution, revolution n, the threshold 226d is applied as shown, to an edge of the DIFF signal 230b corresponding to a gear tooth prior to the gear tooth upon which the threshold 226d was generated on the prior cycle, i.e., of DIFF signal 230a. It will be appreciated that this results in a threshold more accurately placed in relation to each cycle (gear tooth) of the signal 230b.

Accurate threshold placement and resulting edge timing accuracy of the POSCOMP signals 62a, 68a of FIG. 2A is important in applications where the edges are used to represent exact rotational angle of an object. Such accuracy may be important when the rotation (motion) detectors 152 of FIG. 2A, are used, for example, to sense rotation of a camshaft in an automobile in order to control various engine timings.

In still other embodiments, on an nth revolution of the gear 24, the threshold determined during an nth revolution is used, and is not shifted by one edge. In other words, on the nth revolution, thresholds 228a, 228b, 228c, and so on are used. A threshold from a prior cycle is used, and the threshold is used that is associated with the same edge of the gear 24.

Figure 4:
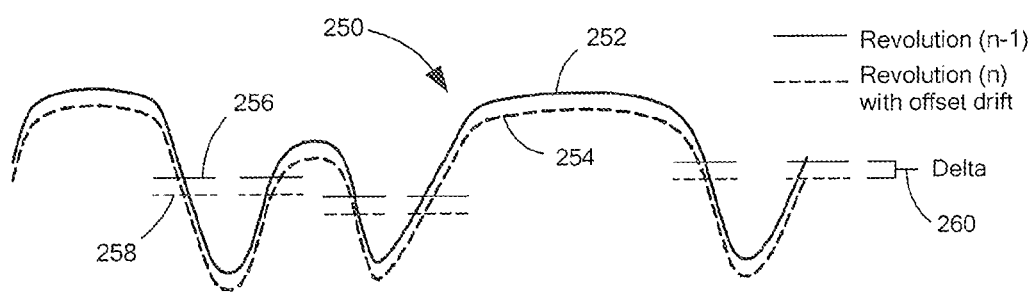
FIG. 4 is a graph showing two magnetic field signals, each at a different revolution of a moving object being sensed, and each having a different DC offset voltage.

Referring now to FIG. 4, a graph 250 has a horizontal axis with a scale in arbitrary units of time and a vertical axis with a scale in arbitrary units of voltage. The graph 250 includes a DIFF signal 252 and a DIFF signal 254, each representative, for example, of the DIFF signal 20a of FIGS. 1 and 2, but each on a different revolution of the gear 24 of FIGS. 1 and 2. A DC offset 260 is shown between the two DIFF signals 252, 254. In accordance with the DC offset 260, different thresholds, e.g., thresholds 256, 258 are determined on each cycle, not yet taking into account any threshold corrections.

By sensing the offset change 260, only available since a history of the thresholds from a plurality of revolutions is stored using techniques described below, a change or drift of the offset can be calculated. The offset change can be applied to the threshold used at each gear tooth (e.g., to thresholds 226a-226f and 228a-228f of FIG. 3) in order to even more accurately position the thresholds.

Figure 5:
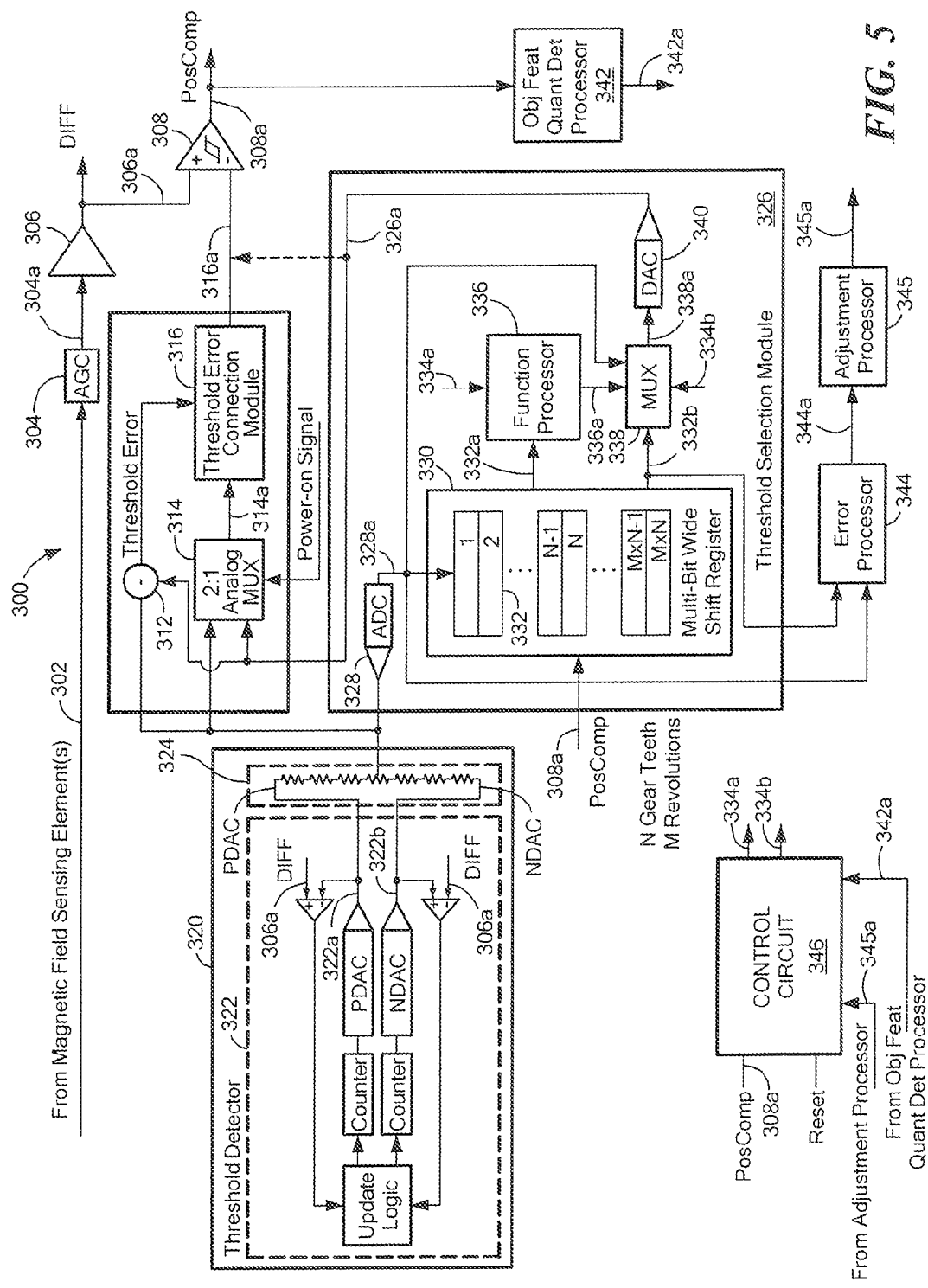
FIG. 5 is a block diagram of an exemplary motion detector that can be used in place of the motion detectors of FIGS. 1, 1B, 2, and 2A, which has an analog threshold generator circuit in the form of a threshold detector, which is discussed above, an analog comparator, and a threshold selection module with a digital memory disposed between the threshold generator circuit and the comparator.

Referring now to FIG. 5, a circuit 300 (i.e., a magnetic field sensor or motion detector 300) for detecting a movement of an object includes at least one magnetic field sensing element (not shown, e.g., 54a-54c of FIGS. 1-2A) for generating DIFF signal 306a proportional to a magnetic field associated with the object (e.g., the gear 24 of FIGS. 1-1A), wherein the DIFF signal 306a has cycles including a present cycle. The circuit 300 provides at least one motion detector 300 configured to generate a motion signal 308a indicative of the movement of the object, wherein the motion signal 308a has edges associated with the cycles of the DIFF signal 306a. The at least one motion detector 300 can include a threshold generator circuit 320 (here a threshold detector 320) coupled to receive the DIFF signal 306a and configured to generate a threshold signal 320a.

The at least one motion detector 300 can also include at least one threshold selection module 326 coupled to receive the threshold signal 320a, configured to save samples 332 of the threshold signal 320a, configured to select samples 332 of the threshold signal 320a associated with of a prior cycle of the DIFF signal 306a a predetermined number of cycles before the present cycle, and configured to generate a selected threshold signal 326a related to the selected samples 336a of the threshold signal 320a. The at least one motion detector 300 can also include a comparator 308 coupled to receive a signal 316a representative of the selected threshold signal 326a, coupled to receive the DIFF signal 306a, configured to compare the signal 316a representative of the selected threshold signal 326a with the DIFF signal 306a, and configured to generate the motion signal 308a.

It will be appreciated that the threshold generator circuit 320 can include a tracking circuit portion 322 that can generate a PDAC signal 322a and an NDAC signal 322b, each of which can track portions of the DIFF signal 306a. The threshold generator circuit 320 can also include a threshold identifier circuit portion 324.

The threshold generator circuit 320 can be the same as or similar to a threshold generator part 116a of the threshold generator and comparator circuit 116 of FIG. 2. The comparator 308 can be the same as or similar to the comparator part 116b of the threshold generator and comparator circuit 116 of FIG. 2. The threshold selection module 326 is coupled between the threshold generator circuit 320 and the comparator 308.

Unlike the threshold generator circuit 116a of FIG. 2, which generates the two threshold signals 132a, 132b, the threshold generator circuit 320 can generate but one threshold signal 320a. Other embodiments that generate two thresholds are shown in conjunction with figures below.

The threshold selection module 326 can include an analog-to-digital converter 328 coupled to receive the threshold signal 320a and configured to generate digital samples 328a of the threshold signal 320a.

The threshold selection module 326 can also include a digital memory 330 in the form of a multi-bit wide digital shift register that can be sized to hold samples associated with M revolutions of the gear 24 of FIGS. 1-2B, each one of the revolutions associated with N samples. Thus, in some embodiments, the memory 330 can be sized to hold M×N multi-bit samples 332 of the threshold signal 320a, i.e., a history of the thresholds. In some embodiments, the digital memory 330 can store a respective sample of the threshold signal 320a on or associated with each positive and negative edge of the PosComp signal 308a. In other embodiments, the digital memory 330 can store a respective sample of the threshold signal 320a on or associated with each positive or each negative edge of the PosComp signal 308a.

In some embodiments, the digital memory 330 can store samples 332 of the threshold signal 320a not associated with every gear tooth (not every POSCOMP), but associated with only some of the gear teeth. Referring briefly to FIG. 3, with these and other arrangements, it is possible to apply the (n−1) revolution thresholds to only some of the cycles (e.g., gear teeth) associated with the nth revolution, for example, to a cycle that has an aberrant amplitude. In other embodiments, the digital memory 330 can store samples 332 of the threshold signal 320a not associated with every gear revolution, but associated with only some of the gear revolutions.

All of these arrangements can use a reduced amount of digital memory 330 and a reduced amount of circuit die area.

The threshold selection module 326 can also include a function processor 336 coupled to the digital memory 330 and configured to process a plurality of selected samples 332a selected from among stored samples 332. The function processor 736 can be an averaging circuit responsive to a control signal 334a for selecting x particular samples 332a to be averaged in order to provide an averaged signal 336a. Each one of the x sample words is clocked to a new sample word in accordance with transitions of the PosComp signal 308a and thus, each of the x sample words is actually a stream of sample words, each representative of a particular cycle of the DIFF signal 306a at or prior to a present cycle of the DIFF signal 306a. Thus, when referring to a sample, it will be understood that the sample is actually a stream of samples. The signal 336a provides a stream of samples, each one of which can be an average of a set of x samples 332a.

In other embodiments, the signal 336a is an RMS average of each set of x samples 332a. In other embodiments, the signal 336a is a weighted average of the each set of x samples 332a, for example, taking more recent samples with a higher weight than earlier samples. It will be appreciated that other combinations of samples may be achieved with the function processor 336.

The threshold selection module 326 can also include a multiplexer 338 configured to select any number of the stored samples 332, each selected sample 332b associated with a different cycle of the DIFF signal 306a. The multiplexer 338 can select y sample words 332b in response to a control signal 334b.

The multiplexer 338 is configured to provide either the y selected samples 332b (which can be one or more samples) to a DAC 340, or the averaged samples 336a to the DAC 340 under the control of the control signal 334b. More particularly, a control circuit 346 provides the control signals 334a and 334b to control how many (x) and which of the stored samples 332 are processed by the function processor 336, how many (y) and which of the stored sample(s) 332b are coupled directly to the multiplexer 338, and which of the streams 336a, 332b provide the multiplexer output signal 338a coupled to the DAC 340.

In one particular embodiment, for a time shortly after the circuit 300 is first powered on, e.g., during a calibration time period, the multiplexer 338 can select as its output signal 338a, the samples 332b, and thereafter, e.g., during a running mode of operation, the multiplexer 338 can select as the output signal 338a, the averaged signal 336a. More particularly, during certain times of operation, the threshold selection module 326 can select one or more samples 332b from the memory 330 on each cycle of the DIFF signal, each respective sample corresponding to the present cycle of the DIFF signal 306a and during other times of operation, the threshold selection module 326 can process, e.g., average, selected samples 332a, for example, samples from the present and three prior cycles of the DIFF signal 306a, to generate the signal 336a. This arrangement of selecting samples 332b for passing through the multiplexer without processing during the calibration mode is advantageous, since immediately after power up, there is may be no threshold history, and peaks from previous cycles are not available and/or are not accurate.

Another use for retaining the history of thresholds in the memory 330 is that, if a threshold associated with a particular gear tooth deviates greatly from revolution to revolution, the deviation can be used to indicate a fault in the magnetic field sensor 300.

It should be apparent that if only one sample (sample stream) is used, then the function processor 338 is not required and may be omitted.

A digital-to-analog converter 340 is coupled to receive the signal 338a and configured to generate an analog sample, or more precisely, a series of analog samples 326a, according to a series of digital samples 338a. The series of analog samples 326a is also referred to herein as a selected threshold signal 326a. It will be appreciated that a filter (not shown) can be used to smooth the selected threshold signal 326a.

In some embodiments, the selected threshold signal 326a can be coupled directly to the comparator 308. However, in other embodiments, the circuit 300 can include a circuit module 310 coupled to receive the selected threshold signal 326a. The circuit module can include a 2:1 analog multiplexer 314 coupled to receive the selected threshold signal 326a, coupled to receive the threshold signal 320a, and configured to generate an output signal 314a as a selected one of the threshold signal 320a or the selected threshold signal 326a under control by a power-on signal 318a. Essentially, for a time shortly after the circuit 300 is first powered on, e.g., during a calibration time period, the a 2:1 analog multiplexer 314 can select as the output signal 314a, the threshold signal 320a, and thereafter, e.g., during a running mode of operation, the a 2:1 analog multiplexer 314 can select as the output signal 314a, the selected threshold signal 326a. This arrangement may be necessary, since immediately after power up, there may be no threshold history, and a threshold from a previous revolution of the gear 24 is not available.

A threshold error correction module 316 can be coupled to receive the signal 314a and can be configured to generate a signal 316a, which can be, at times after predetermined amount of time from power up, representative of the selected threshold signal 326a, and at times within the predetermined amount of time from power up, representative of the threshold signal 320a.

The circuit module 310 can also include a differencing circuit 312 coupled to receive the threshold signal 320a, coupled to receive the selected threshold signal 326a, and configured to generate a signal 312a as a difference of the threshold signal 320a and the selected threshold signal 326a. The threshold error correction module 316 can also be coupled to receive the signal 312a.

In operation, the threshold selection module 326 selects one or more samples from the memory 330 on each cycle of the DIFF signal, each respective sample the same respective time prior to the present cycle of the DIFF signal 306a. In some embodiments, the threshold selection module 326 can process, e.g., average, the selected samples, for example, samples from five prior cycles of the DIFF signal 306a to generate the selected threshold signal 326a.

In some embodiments, the threshold selection module 326 selects only one sample, for example, a threshold sample from a cycle immediately prior to the present cycle of the DIFF signal 306a and passes the one sample through to the selected threshold signal 326a without processing.

In some other embodiments, the threshold selection module 326 selects only one sample, for example, a threshold sample from a corresponding cycle from a revolution of the gear 24 (FIG. 1) immediately prior to the present revolution, and passes the one sample through to the selected threshold signal 326a without processing.

As described above, it will be appreciated that generation of the selected threshold signal 326a in accordance with a function of a plurality of thresholds from prior cycles, or in accordance with one cycle immediately prior to the present cycle, or in accordance with one corresponding cycle of a prior revolution, it is possible to establish the selected threshold signal 326a more accurately and less subject to mechanical irregularities, wobble, or runout of the gear 24.

In some embodiments, the memory 330 is a nonvolatile memory. Thus, it should also be appreciated that, by storing threshold values, 332, the magnetic field sensor 300 can be able to power down and power back up, and the magnetic field sensor can use the stored threshold values 332 to rapidly achieve an accurate motion output signal 308a.

In some embodiments, the magnetic field sensor 300 includes an error processor 344 coupled to receive the digital samples 328a of the threshold signal 320a and coupled to receive the stored samples 332b. The error processor 344 can be operable to generate an error signal 344a indicative of a difference between the input signals being above a predetermined amount. An adjustment processor 345 can receive the error signal 344a and can generate an adjustment signal 345a.

In some embodiments, the magnetic field sensor 300 includes an object feature quantity detection processor 342 coupled to receive the PosComp signal 308a and configured to generate a quantity signal 342a indicative of a quantity of features upon the target object, e.g., teeth upon the gear 24 of FIG. 1. The object feature quantity detection processor 342 can make this determination, for example, during factory testing, wherein the gear 24 can be spun at a known rotation speed and the object feature quantity detection processor 342 can count edges of the PosComp signal 308a for a predetermined amount of time.

In some embodiments, the control circuit 346 is coupled to receive the adjustment signal 345a and the quantity signal 342a.

In some embodiments, the control circuit 346 generates the control signals 334a, 334b in accordance with the quantity signal 342a. Thus, the function processor 336 and the mux 358 are controlled to select samples that are appropriate for the detected number of features upon the target object, i.e., that are a proper number of gear teeth from a presently detected gear tooth.

In some embodiments, the control circuit 346 generates the control signals 334a, 334b in accordance with the adjustment signal 345a. Thus, the function processor 336 and the mux 358 are controlled to adjust the stored threshold samples 332 that are used at a current gear tooth.

In some embodiments, the control circuit 346 can be coupled to receive the error signal 344a (coupling not shown) and can be configured to select a quantity of features to use in normal operation (selected from time to time or at startup, or selected during factory testing) by selecting (and testing) possible quantities of target features (e.g., gear teeth) and selecting for normal operation a tested quantity of features that results in a lowest error signal 344a, or that results in the error signal 344a being below the above-described predetermined amount. In these embodiments, the control circuit 346 identifies the quantity signal 342a. Other functional partitioning that achieves results described above is also possible between the error processor 344, the adjustment processor 345, the object feature quantity detection processor 342, and the control circuit 346.

While the signal 320a is referred to above as a threshold signal 320a, the signal 320a can also be referred to herein as a peak-related signal. While the signals 332a, 332b are referred to above as selected samples, the signals 334a, 334b can also be referred to herein as sampled signals. The same pertains to similar signals in FIGS. 6-10.

Figure 6:
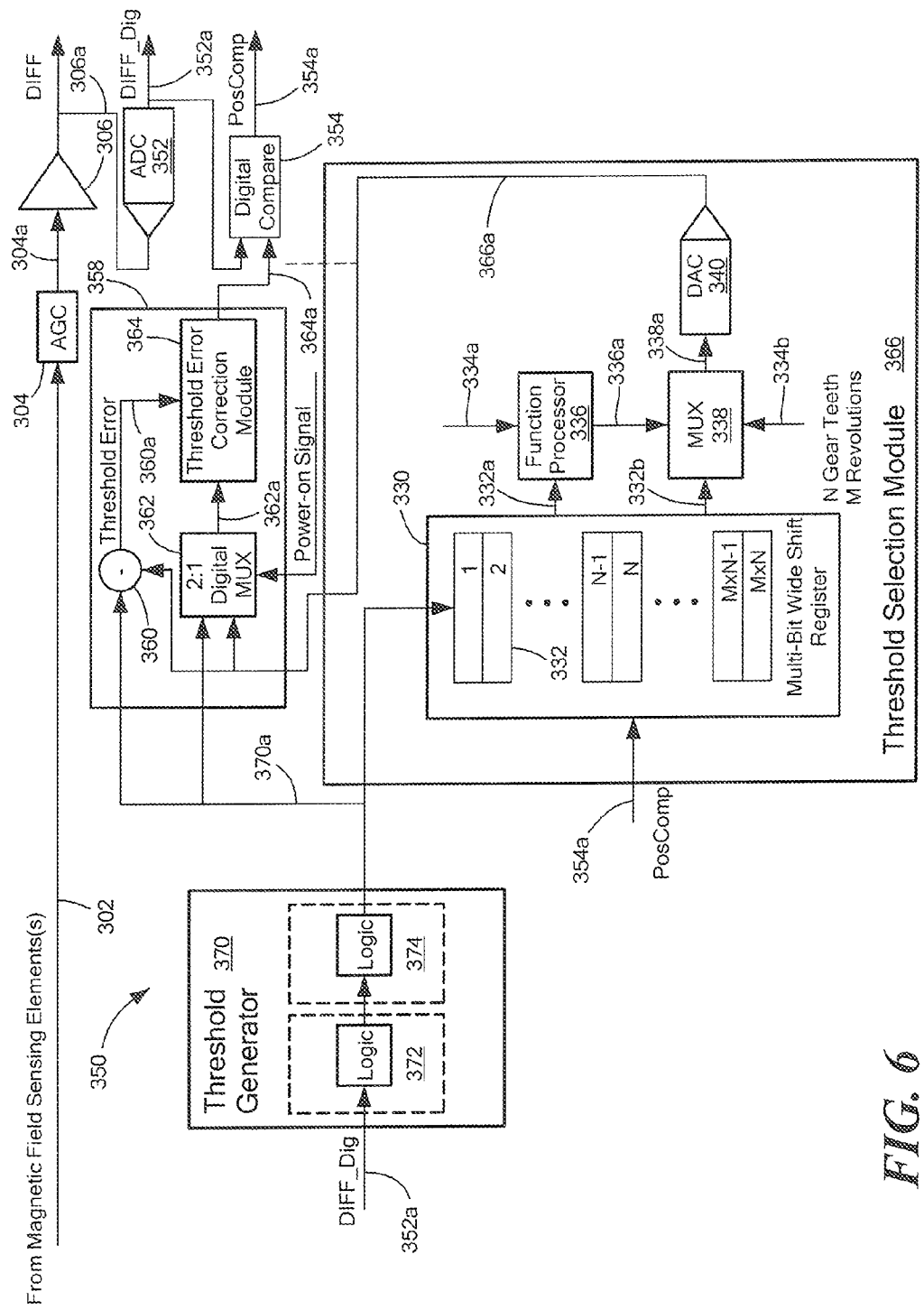
FIG. 6 is a block diagram of another exemplary motion detector that can be used in place of the motion detectors of FIGS. 1, 1B, 2, and 2A, which has a digital threshold generator circuit, a digital comparator, and a threshold selection module with a digital memory disposed between the threshold generator circuit and the comparator.

Referring now to FIG. 6, in which like elements of FIG. 5 are shown having like reference designations, a circuit 350 can have characteristics similar to those of the circuit 300 of FIG. 5, however, some of the analog circuits shown in FIG. 5 are replaced by corresponding digital circuits. For example, the threshold generator circuit 320 of FIG. 5 can be replaced by a threshold generator circuit 370 that implements the tracking circuit 322 and the threshold identifier circuit 324 of FIG. 5 as logic circuits 372, 374, respectively. The threshold generator circuit 372 is coupled to receive a DIFF signal 352a, wherein the DIFF signal 352a is digitized by an analog-to-digital converter 352, and is configured to generate a threshold signal 370a, also a digital signal.

A threshold selection module 366 can be entirely digital, not requiring the analog-to-digital converter 328 or the digital-to-analog converter 340 of FIG. 5. The threshold selection module 366 is configured to generate a selected threshold signal 366a, which can be a digital signal.

A circuit module 358 can be coupled to receive the selected threshold signal 366a and to receive the threshold signal 370a. The circuit module 358 can include a differencing circuit 360, a 2:1 digital multiplexer 362, and a threshold error correction module 364 coupled in the same way as and with functions the same as or similar to the differencing module 312, the 2:1 analog multiplexer 314, and the threshold error correction module 316 of FIG. 5. However, the circuit module 358 has digital circuits, unlike the circuit module 310 of FIG. 5, which has analog circuits.

The circuit 350 can include a digital comparator 354 coupled to receive an output signal 364a from the threshold error correction module 364 and also coupled to receive the digitized DIFF signal 352a. The digital comparator 354 is configured to generate a PosComp signal 354a, which can be the same as or similar to the PosComp signal 308a of FIG. 5.

It will be appreciated that many of the functions of the circuit 350 are implemented with digital circuits that perform the same or similar functions to the analog circuits of the circuit 300 of FIG. 5.

While the control circuit 346, the object feature quantity detector 342, the error processor 344, and the adjustment processor 345 of FIG. 5 are not shown, it will be understood that those elements can be used in the magnetic field sensor 350 and also in any of the magnetic field sensors described in other figures herein.

Figure 7:
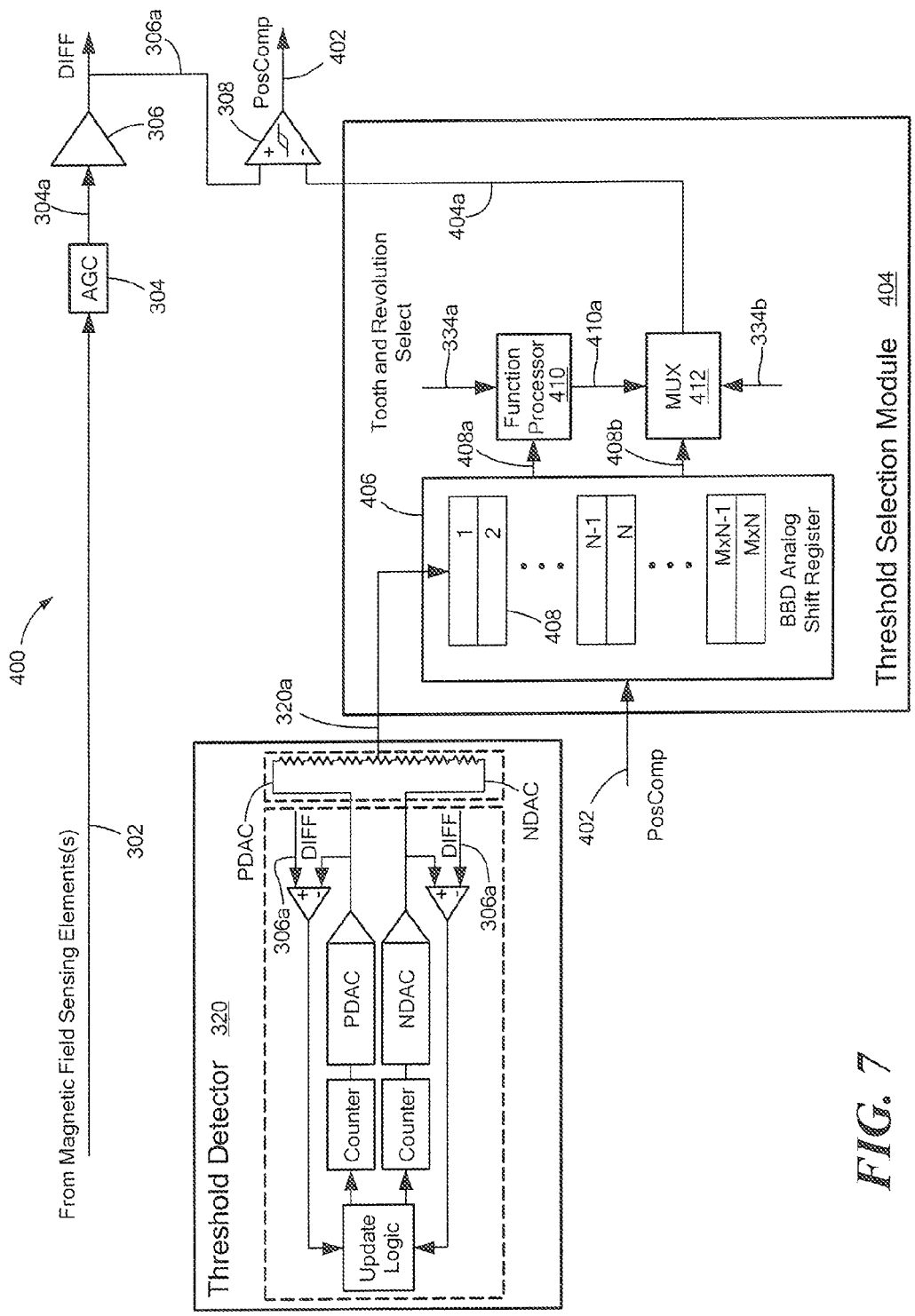
FIG. 7 is a block diagram of yet another exemplary motion detector that can be used in place of the motion detectors of FIGS. 1, 1B, 2, and 2A, which has an analog threshold generator circuit in the form of a threshold detector, which is discussed above, an analog comparator, and a threshold selection module with an analog memory disposed between the threshold generator circuit and the comparator.

Referring now to FIG. 7, in which like elements of FIG. 5 are shown having like reference designations, a circuit 400 includes the threshold generator circuit 320 of FIG. 5 configured to generate the threshold signal 320a.

A threshold selection module 404 is coupled to receive the threshold signal 320a, and configured to store analog samples 408 of the threshold signal 320a. The analog samples can be stored in a bucket brigade device (BBD) 406 or the like. A BBD will be understood to be an analog shift register capable of storing and shifting discrete analog samples.

The threshold selection module 404 can include an analog function circuit 410 coupled to receive analog samples 408a and configured to perform a function upon the analog samples 408a. The function performed by the analog function module 410 can be the same as or similar to the functions described above in conjunction with the function processor 336 of FIG. 5. However, the analog function circuit 410 can perform the functions with analog circuits.

The magnetic field sensor 400 can also include and analog multiplexer 412, which can perform function the same as or similar to the multiplexer 338 of FIG. 5.

The threshold selection module 404 is configured to generate a selected threshold signal 404a, which can be the same as or similar to the selected threshold signal 326a of FIG. 5.

Figure 8:
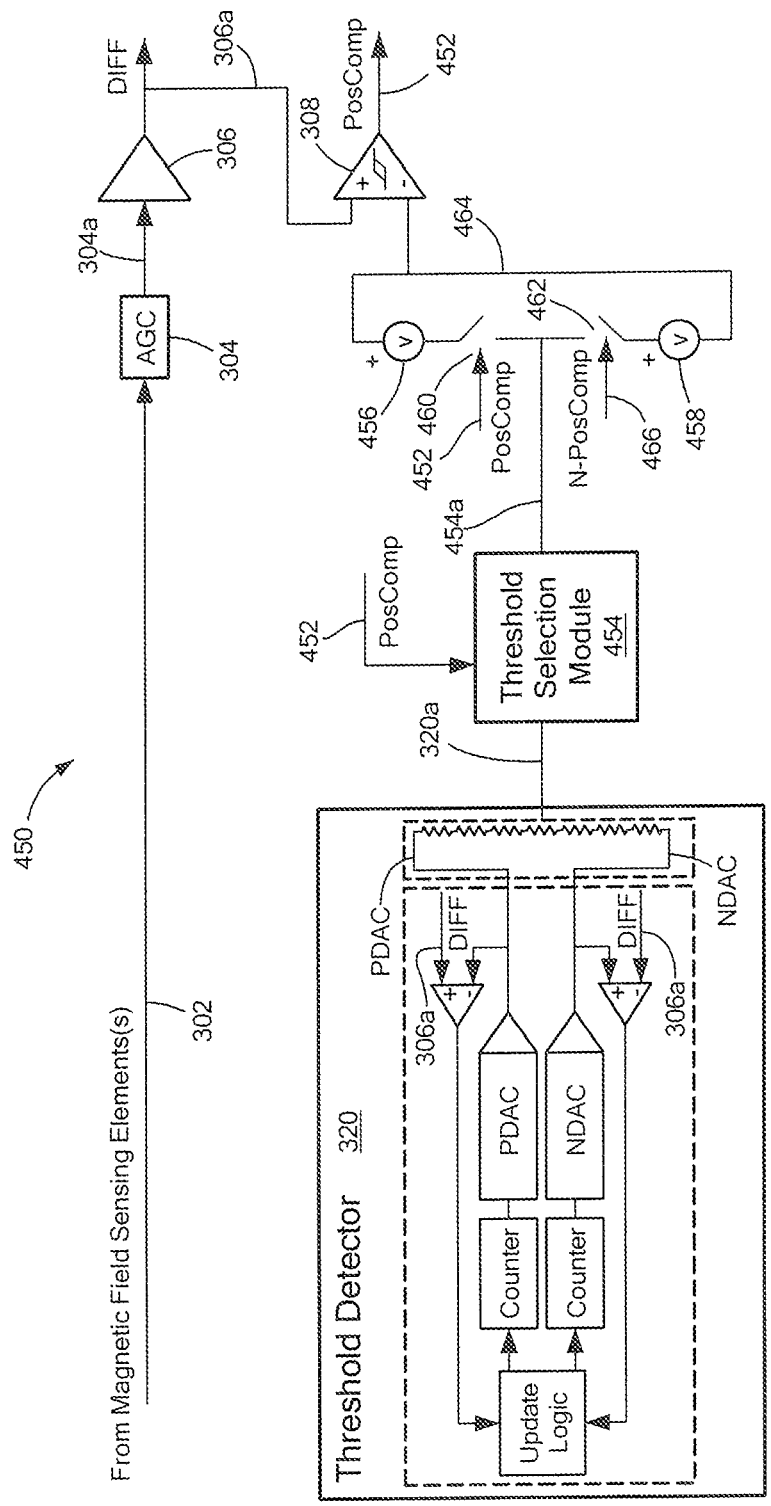
FIG. 8 is a block diagram of yet another exemplary motion detector that can be used in place of the motion detectors of FIGS. 1, 1B, 2, and 2A, which has an analog threshold generator in the form of a threshold detector, which is discussed above, an analog comparator, a threshold selection module disposed between the threshold generator circuit and the comparator, and which is configured to generate two thresholds before the comparator.

Referring now to FIG. 8, in which like elements of FIG. 5 are shown having like reference designations, a circuit 450 can include a threshold selection module 454, which can be the same as or similar to threshold selection modules 326, 404 of FIGS. 5 and 7, respectively. The threshold selection module is coupled to receive a PosComp signal 452 and the threshold signal 320a and configured to generate a selected threshold signal 454a. The selected threshold signal 454a can be the same as or similar to the selected threshold signal 326a of FIG. 5 or the selected threshold signal 404a of FIG. 6.

The selected threshold signal 454a is received by first and second switches 460, 462, respectively. The first switch 460 is controlled by the PosComp signal 452 and the second switch 462 is controlled by and inverted version of the PosComp signal 466, resulting in the two switches 460, 462 opening and closing alternately.

A first voltage source 456 is coupled to receive an output signal from the first switch 460 at its negative node and a second voltage source 458 is coupled to receive an output signal from the second switch 462 at its positive node.

A threshold signal 464 alternates between two signal levels in the same way as the threshold signal 138 of FIG. 2. The comparator 308 is coupled to receive the threshold signal 464 and the DIFF signal 306a and configured to generate the PosComp signal 452.

Figure 9:
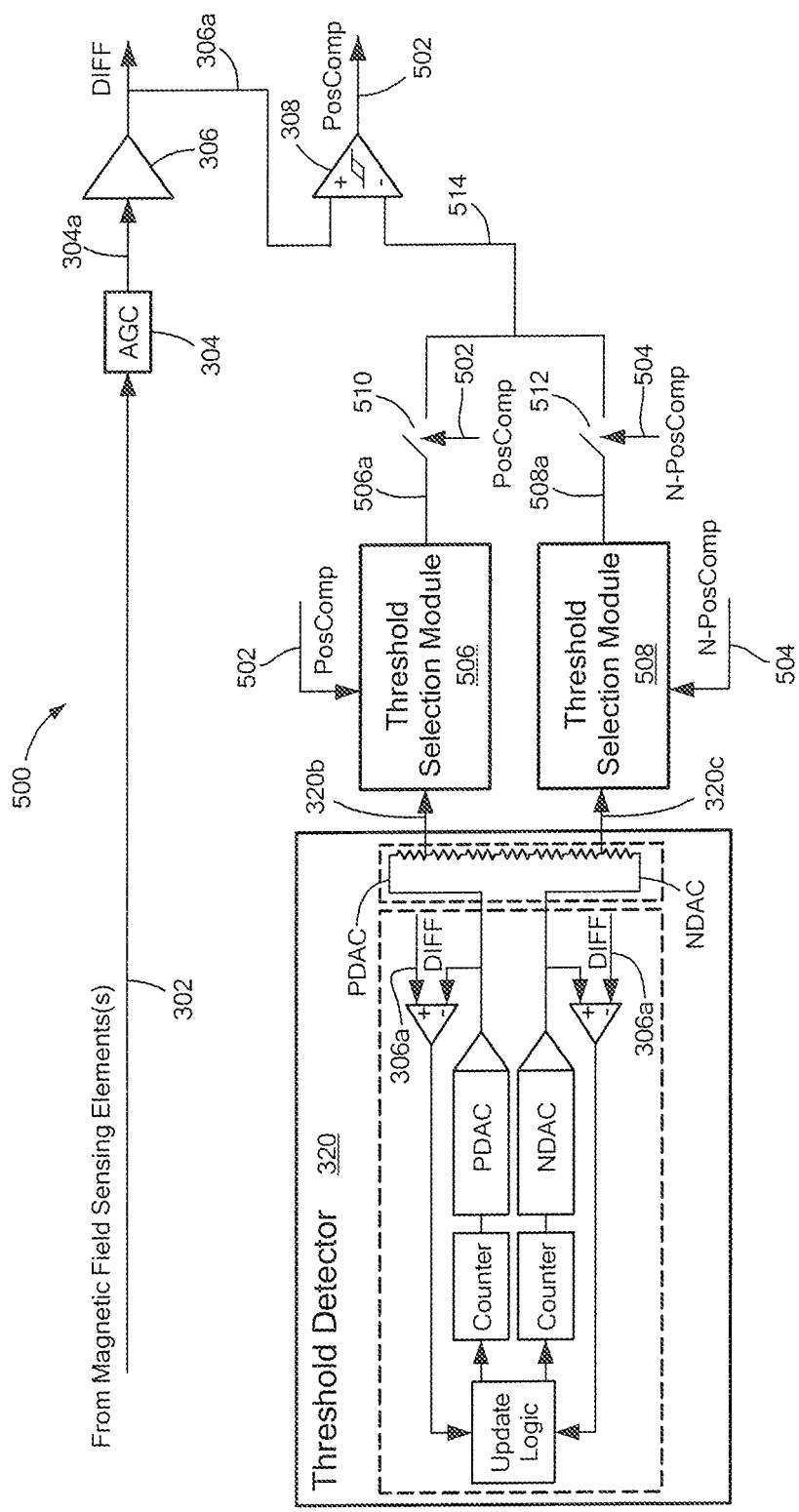
FIG. 9 is a block diagram of yet another exemplary motion detector that can be used in place of the motion detectors of FIGS. 1, 1B, 2, and 2A, which has an analog threshold generator in the form of a threshold detector, which is discussed above, an analog comparator, and two threshold selection modules disposed between the threshold generator circuit and the comparator, and which is configured to generate two thresholds before the comparator.

Referring now to FIG. 9, in which like elements of FIG. 5 are shown having like reference designations, a circuit 500 can achieve the two alternating thresholds of FIG. 8, but in a different way. Here, the threshold generation module 320 is configured to generate two threshold signals 320b, 320c instead of the one threshold signal 320a of FIG. 5.

A first threshold selection module 506 is coupled to receive the threshold signal 320b and a second threshold selection module 508 is coupled to receive the threshold signal 320c. The first threshold selection module 506 is also coupled to receive a PosComp signal 502 and the second threshold selection module 508 is also coupled to receive an inverted PosComp signal 504, which signals clock the respective first and second threshold selection modules 506, 508, in the same way that the PosComp signal 308a of FIG. 5 clocks the threshold selection module 326 of FIG. 5.

The threshold selection modules 506, 508 can be the same as or similar to the threshold selection modules 326 and 404 of FIGS. 5 and 7, respectively.

The first threshold selection module 506 is configured to generate a first selected threshold signal 506a and the second threshold selection module 508 is configured to generate a second selected threshold signal 508a, each of which can be the same as or similar to the selected threshold signal 326a of FIG. 5.

A first switch 510 is coupled to receive the first selected threshold signal 506a and a second switch 512 is coupled to receive the second selected threshold signal 508a. The first switch 510 is controlled by the PosComp signal 502 and the second switch 512 is controlled by the inverted PosComp signal 504. Therefore, like the switches 460 and 462 of FIG. 8, the switches 510, 512 operate alternately to generate a threshold signal 514 that alternates between two signal levels in the same way as the threshold signal 138 of FIG. 2.

The comparator 308 is coupled to receive the threshold signal 514 and the DIFF signal 306a and configured to generate the PosComp signal 502.

Figure 10:
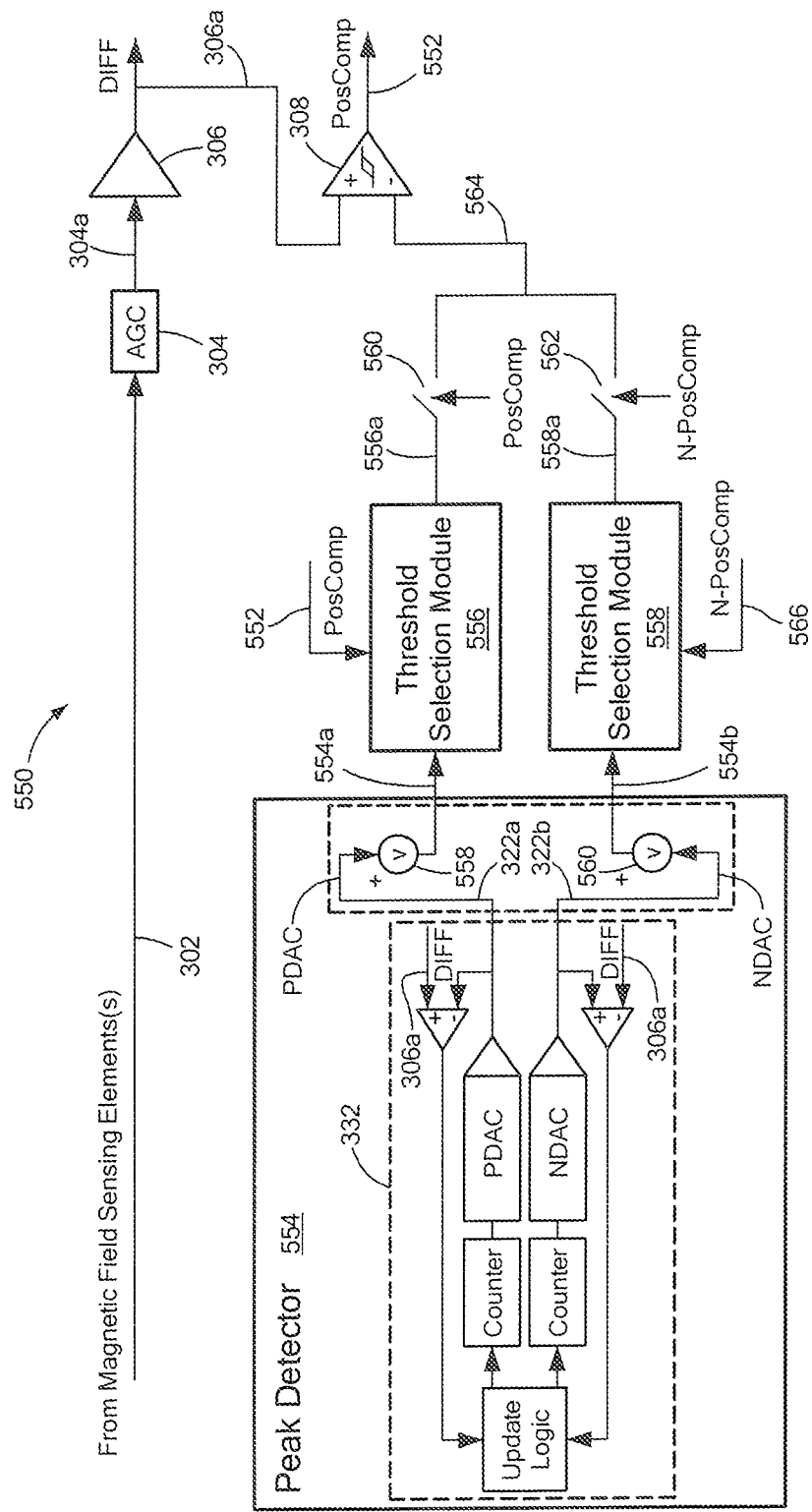
FIG. 10 is a block diagram of yet another exemplary motion detector that can be used in place of the motion detectors of FIGS. 1, 1B, 2, and 2A, which has an analog threshold generator in the form of a peak detector, which is also discussed above, an analog comparator, and two threshold selection modules disposed between the threshold generator circuit and the comparator, and which is configured to generate two thresholds before the comparator.

Referring now to FIG. 10, in which like elements of FIG. 5 are shown having like reference designations, the threshold generator circuit 320 of FIG. 5 is replaced with a threshold generator circuit 554, and in particular, the threshold identifier circuit 324 of FIG. 5 is replaced with a threshold identifier circuit 557. Unlike the threshold generator circuit 326 of FIG. 5, which is a threshold detector, the threshold generator circuit 554 is a peak detector.

The threshold identifier circuit 557 includes a first voltage source coupled to receive the tracking signal 322a and a second voltage source 560 coupled to receive the tracking signal 322b. The first voltage source 558 is configured to generate a first threshold signal 554a and the second voltage source 560 is configured to generate a second threshold signal 554b.

First and second threshold selection modules 556, 558 can be the same as or similar to the first and second threshold selection modules 506, 508 of FIG. 9 and are coupled to receive the first and second threshold signals 554a, 554b, respectively. The first threshold selection module 556 is also coupled to receive a PosComp signal 552 and the second threshold selection module 558 is also coupled to receive an inverted PosComp signal 566, which signals clock the respective first and second threshold selection modules 556, 558, in the same way that the PosComp signal 308a of FIG. 5 clocks the threshold selection module 326 of FIG. 5.

The first and second threshold selection modules 556, 558 are configured to generate first and second selected threshold signals 556a, 558a, respectively, which are coupled to first and second switches 560, 562, respectively. The first switch 560 is controlled by the PosComp signal 552 and the second switch 562 is controlled by the inverted PosComp signal 566. Therefore, like the switches 460 and 462 of FIG. 8, the switches 560, 562 operate alternately to generate a threshold signal 564 that alternates between two signal levels in the same way as the threshold signal 138 of FIG. 2.

The comparator 308 is coupled to receive the threshold signal 564 and the DIFF signal 306a and configured to generate the PosComp signal 552.

The circuit module 310 of FIG. 5 is not shown in FIGS. 7-10, however, in other embodiments, the circuits 400, 450, 500, and 550 of FIGS. 7-10 can include a circuit module the same as or similar to the circuit module 310.

It should be appreciated that parts of the circuits of FIGS. 5-10 can be interchanged with each other. For example, an analog threshold selection module such as the threshold selection module 404 of FIG. 7 can be used in any of the circuits of FIGS. 5-10.

Figure 11:
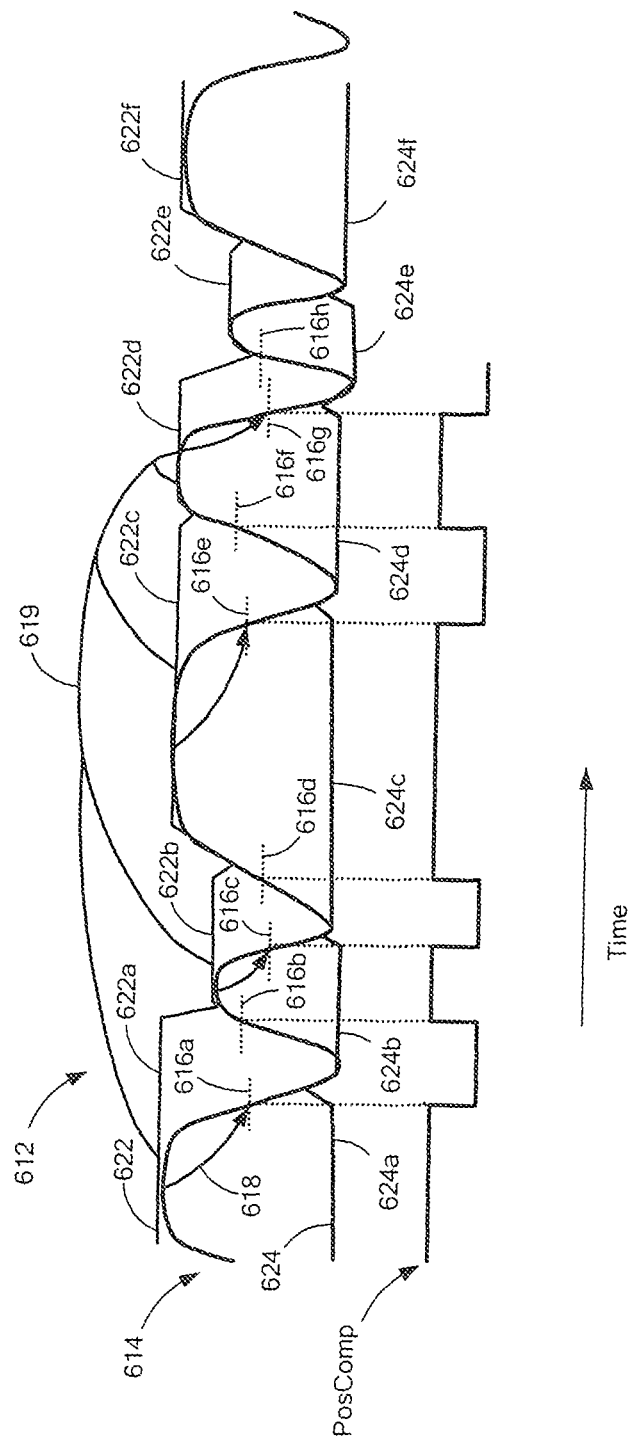
FIG. 11 is a graph showing a magnetic field signal, with associated PDAC and NDAC signals and thresholds, and the resulting PosComp signal.

Referring now to FIG. 11, a graph 612 has a horizontal axis with a scale in arbitrary units of time, which can be related to rotation angle or linear displacement of the object 24 of FIG. 1 and a vertical axis with a scale in arbitrary units of voltage, which can be related to magnetic field strength (Gauss) or an associated digital value. The waveform 614 can be a DIFF signal representative, for example, of the DIFF signal 20a of FIGS. 1 and 2 with cycles of the signal 614 being indicative of target regions 24a-24c of FIG. 1B passing the magnetic field sensing elements 52a-52c of FIG. 1B. In normal operation, a PDAC signal 622 can reach and acquire positive peaks of the DIFF signal 614. Similarly, an NDAC signal 624 can reach and acquire negative peaks of the DIFF signal 614. Thresholds 616a-616h can be calculated during cycles of the DIFF signal 614. The thresholds 616a-616h may correspond, for example, to threshold signals as may be taken from taps of a threshold generator resistor ladder.

According to an aspect of the invention, one or more thresholds are generated on the basis of samples of a peak signal (PDAC and/or NDAC) taken during one or more prior cycles of the DIFF signal 614. In one particular embodiment, each of a first predetermined number of thresholds, such as thresholds 616a-616f, are based on peak signal samples taken during the respective cycle of the DIFF signal 614; whereas, after the predetermined number of DIFF signal cycles has occurred, each threshold 616g-616h for example is based on a mathematical combination, such as an average of the peak signal samples taken during prior cycles (and possibly also the present cycle) of the DIFF signal 614. For example, thresholds 616a and 616b may be based on peak signal samples taken during the first shown DIFF signal cycle, threshold levels 616c and 616d may be based on peak signal samples taken during the second shown DIFF signal cycle, and so forth until a predetermined signal cycle, such as a fourth signal cycle. Arrows, of which arrow 618 is representative, illustrate use of a PDAC signal sample from the present DIFF signal cycle to establish the threshold for the present cycle. The threshold levels 616g and 616h used during the fourth DIFF signal cycle can be established by averaging the peak signal samples taken during each of the previous four signal cycles (i.e., the present cycle and the three prior cycles). Arrow 619 illustrates use of peak signal samples from present and prior cycles of the DIFF signal to generate threshold 616g.

While the DIFF signal 614 of FIG. 11 is used to illustrate embodiments in which the threshold signal is based on an average of peak signal samples from a predetermined number of prior DIFF signal cycles, it is also possible to establish the threshold signal based on DIFF signal cycles from a prior revolution of the target as explained above with reference to FIG. 3. Furthermore, it is also possible to establish the threshold signal based on a mathematical combination of prior threshold signals (as opposed to a mathematical combination of previous peak signal samples) as is also explained above with reference to FIG. 3.

Also shown in FIG. 11 is the PosComp signal as shown (e.g., 552 of FIG. 10) that transitions each time the DIFF signal 614 crosses a threshold 616a-616h as shown.

FIGS. 5-9 above show magnetic field sensors in which pre-computed thresholds are stored. In contrast, figures below show embodiments in which peak values are stored, and threshold are computed thereafter.

Figure 12:
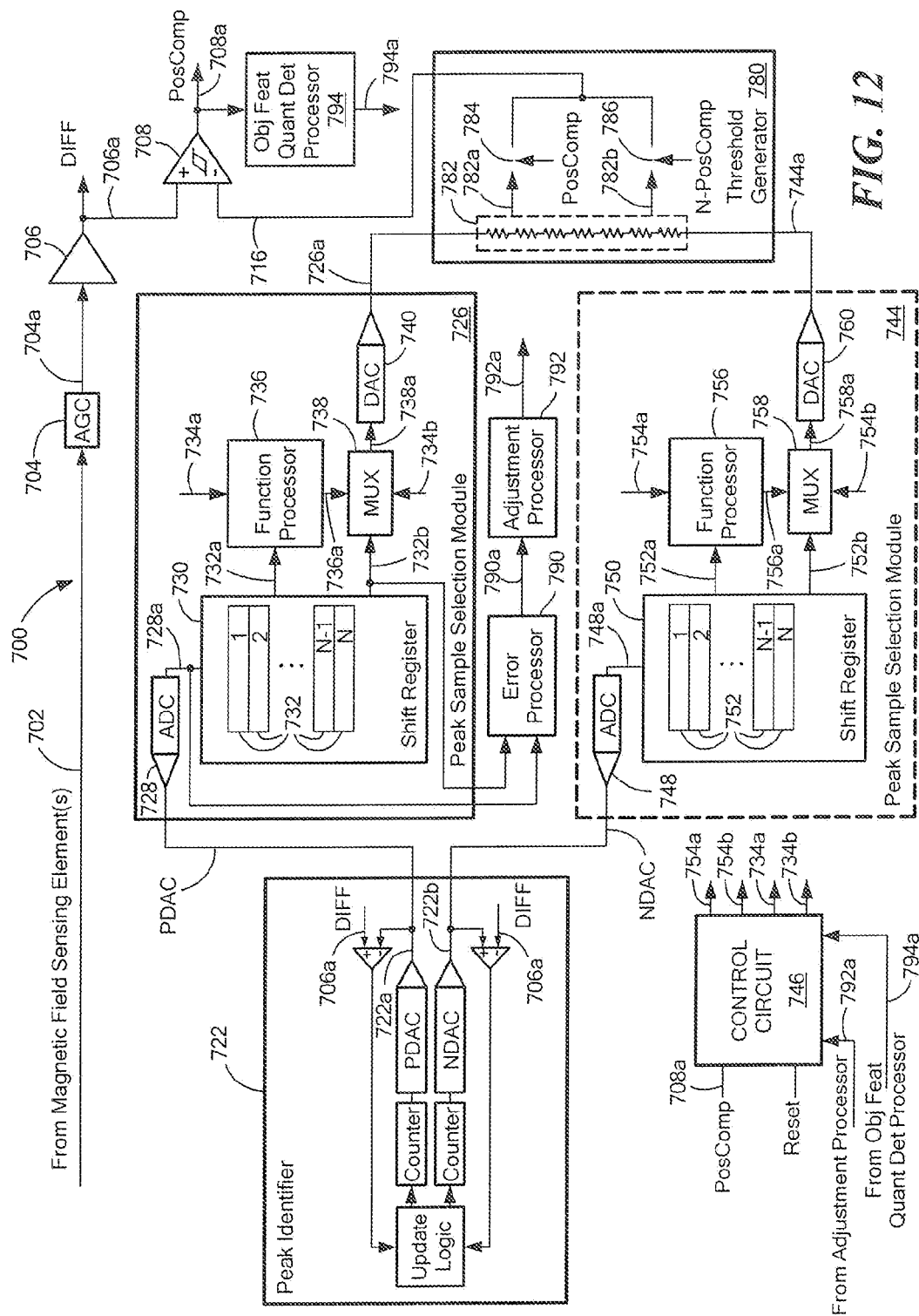
FIG. 12 is a block diagram of an exemplary motion detector that can be used as the motion detectors of FIGS. 1, 1B, 2, and 2A, having an analog peak identifier, a peak sample selection module, a threshold generator, and an analog comparator.

Referring now to FIG. 12, a circuit 700 (i.e., a motion detector) for detecting a movement of an object includes at least one magnetic field sensing element (not shown, e.g., 52a-52c of FIG. 1B) for generating DIFF signal 706a proportional to a magnetic field associated with the object (e.g., the gear 24 of FIGS. 1 and 1B), wherein the DIFF signal 706a has cycles including a present cycle. The circuit 700 generates a motion signal 708a indicative of the movement of the object, wherein the motion signal 708a has edges associated with the cycles of the DIFF signal 706a.

The motion detector 700 can include a peak identifier circuit 722 coupled to receive and to track portions of the DIFF signal 706a, such as positive and negative peaks in order to provide positive and negative peak tracking signals, or simply peak signals, PDAC 722a and NDAC 722b, respectively.

The motion detector 700 can also include at least one peak sample selection module 726 coupled to receive a peak tracking signal, such as the PDAC signal 722a, configured to save samples 732 of the PDAC signal 722a, configured to select saved samples 732 of the PDAC signal associated with at least one prior cycle of the DIFF signal 706a, and configured to generate a selected peak signal 726a related to the selected samples 732 of the PDAC signal 722a. Since the peak sample selection module 726 is responsive to the positive peak tracking signal 722a, such module 726 may be referred to as the positive peak sample selection module that generates a positive selected peak signal 726a.

In some embodiments, the motion detector 700 can include a second, negative peak sample selection module 744 coupled to receive a different peak tracking signal, such as the NDAC signal 722b, configured to save samples 752 of the NDAC signal 722b, configured to select saved samples 752 of the NDAC signal associated with at least one prior cycle of the DIFF signal 706a, and configured to generate a selected peak signal 744a related to the selected samples 752 of the NDAC signal 722b. Since the peak sample selection module 744 is responsive to the negative peak tracking signal 722b, such module 744 may be referred to as the negative peak sample selection module that generates a negative selected peak signal 744a. Details and operation of the peak sample selection module 744 are similar to the peak sample selection module 726.

The motion detector 700 can also include a threshold generator circuit 780 that is responsive to the positive selected peak signal 726a, the negative selected peak signal 744a (in those embodiments containing the negative peak sample selection module 744), and that provides a threshold signal 716. The threshold generator circuit 780 computes the threshold signal 716 based on the selected peak signals 726a and 744a, which threshold signal 716 may provide, for example, threshold signals 216a-216h of FIG. 3. The threshold generator 780 may include a resistor divider 782 having a first tap 782a coupled to a first switch 784 and a second tap 782b coupled to a second switch 786. The first switch 784 is controlled by the PosComp signal 708a and the second switch 786 is controlled by an inverted version, N-PosComp, of the PosComp signal. With this arrangement, the threshold signal 716 is provided by the tap 782a at a first level corresponding to a first percentage of the difference between the positive selected peak signal 726a and the negative selected peak signal 744a when the DIFF signal 706a exceeds the threshold signal 716 and by the tap 782b at a second level corresponding to a second percentage of the difference between the positive selected peak signal 726a and the negative selected peak signal 744a when the DIFF signal is less than the threshold signal 716.

In embodiments in which the negative peak sample selection module 744 is not present, the NDAC signal 722b can be coupled directly to the resistor divider 782 in place of the negative selected peak signal 744a. It will be appreciated by those of ordinary skill in the art that other arrangements are possible for generating the threshold signal 716 from just one or the other of the PDAC and NDAC signals or of the positive selected peak signal and negative selected peak signal, respectively. As one example, the positive selected peak signal 726a can be coupled to the resistor divider and the other end of the resistor divider can be coupled to a reference potential. A tap of the resistor divider can provide a threshold signal as a percentage of the coupled signal (e.g., the positive selected peak signal) and the other, non-coupled signal (e.g., the negative selected peak signal) can be estimated by taking the inverse of the measured signal.

The motion detector 700 includes a comparator 708 coupled to receive the threshold signal 716 and the DIFF signal 706a, configured to compare the threshold signal 716 with the DIFF signal 706a, and configured to generate the motion signal 708a.

The peak sample selection module 726 can include an analog-to-digital converter 728 coupled to receive the PDAC signal 722a and configured to generate digital samples 728a of the PDAC signal 722a.

The peak sample selection module 726 can also include a digital memory 730 such as in the form of a shift register that can be sized to hold N samples associated with N cycles of the DIFF signal 706a. In one embodiment, the digital memory 730 is configured to store at least four samples of the PDAC signal 722a associated with four cycles of the DIFF signal; namely a sample from the present cycle and samples from each of the three cycles immediately preceding the present cycle. It will be appreciated by those of ordinary skill in the art that samples from not only one or more prior revolutions and from one or more target features from such revolutions can be stored, but also the number of samples stored can be varied.

However, as noted with respect to FIG. 3 above, various combinations of peak signal samples can be used to generate the thresholds and thus, various combinations of PDAC signal samples may be stored in the memory 730. For example, the memory 730 can store samples of the PDAC signal 722a associated with M revolutions of the target 24, each one of the revolutions associated with N samples. Thus, in some embodiments, the memory 730 can be sized to hold M×N multi-bit samples of the PDAC signal 722a. In some embodiments, the digital memory 730 can store samples of the PDAC signal 722 not associated with every target features 24a-24c (i.e., every DIFF signal cycle), but associated with only some of the target features. In other embodiments, the digital memory 730 can store samples of the PDAC signal 722a not associated with every target revolution, but associated with only some revolutions. In general, the stored samples can be from all or some previous revolutions from which revolutions the stored samples can be from all or some target features from those revolutions. These arrangements can use a reduced amount of digital memory 730 and a reduced amount of circuit die area. Another use for retaining the history of PDAC signal in the memory 730 is that, if a peak associated with a particular target feature (i.e., gear tooth) deviates greatly from revolution to revolution, the deviation can be used to indicate a fault in the magnetic field sensor 700.

The peak sample selection module 726 can also include a function processor 736 coupled to the digital memory 730 and configured to process a plurality of selected samples 732a selected from among the stored samples 732. The function processor 736 can be an averaging circuit responsive to a control signal 734a for selecting x particular samples 732a to be averaged in order to provide an averaged signal 736a. Each one of the x sample words is clocked to a new sample word in accordance with transitions of the PosComp signal 708a and thus, each of the x sample words is actually a stream of sample words, each representative of a particular cycle of the DIFF signal 706a at or prior to a present cycle of the DIFF signal 706a. Thus, when referring to a sample, it will be understood that the sample is actually a stream of samples. The signal 736a provides a stream of samples, each one of which is an average of a set of x samples 732a.

In other embodiments, the signal 736a is an RMS average of each set of x samples 732a. In other embodiments, the signal 736a is a weighted average of the each set of x samples 732a, for example, taking more recent samples with a higher weight than earlier samples. It will be appreciated that other combinations of samples may be achieved with the function processor 736.

The peak sample selection module 726 can also include a multiplexer 738 configured to select any number of the stored samples 732 of the PDAC signal 722a, each selected sample 732b associated with a different cycle of the DIFF signal 706a. The multiplexer 738 can select the y sample words 732b in response to a control signal 734b.

The multiplexer 738 is configured to provide either the y selected samples 732b (which can be one or more samples) to a DAC 740 or the averaged samples 736a to the DAC 740 under the control of a control signal 734b. More particularly, a control circuit 746 provides the control signals 734a and 734b to control how many (x) and which of the stored samples 732 are processed by the function processor 736, how many (y) and which of the stored sample(s) 732b are coupled directly to the multiplexer 738, and which of the streams 736a, 732b provide the multiplexer output signal 738a coupled to the DAC 740. For example, for a time shortly after the circuit 700 is first powered on, e.g., during a calibration time period, the multiplexer 738 can select as its output signal 738a, the peak signal sample 732b, and thereafter, e.g., during a running mode of operation, the multiplexer 738 can select as the output signal 738a, the averaged signal 736a. More particularly, during certain times of operation, the peak sample selection module 726 selects one or more samples 732b from the memory 730 on each cycle of the DIFF signal, each respective sample corresponding to the present cycle of the DIFF signal 706a and during other times of operation, the peak sample selection module 726 processes, e.g., averages, selected samples 732a, for example, samples from the present and three prior cycles of the DIFF signal 706a to generate the selected peak signal 726a. This arrangement of selecting samples 732b for passing through the multiplexer without processing during the calibration mode is advantageous, since immediately after power up, there is no threshold history, and peaks from previous cycles are not available and/or are not accurate.

The DAC converter 740 is coupled to receive the signal 738a and configured to generate an analog sample, or more precisely, a series of analog samples 726a (referred to herein as the positive selected peak signal 726a), according to a series of digital samples 738a. It will be appreciated that a filter (not shown) can be used to smooth the selected peak signal 726a. It will also be appreciated that the peak signal samples may be stored in the register 730 in analog form, in which case the analog-to-digital converter 728 may be omitted and the memory 730 may be replaced by a bucket brigade device (BBD) or the like which will be understood to be an analog shift register capable of storing and shifting discrete analog samples. In this case, an analog function circuit configured to perform a function upon stored analog signal samples may replace the digital function processor 736. The function performed by the analog function module can be the same as or similar to the functions described above in conjunction with the function processor 410 of FIG. 7.

Generation of the threshold signal 716 in accordance with a function of a plurality of peak signal samples from prior cycles establishes a more accurate threshold signal 716 and a resulting motion signal 708a that is less susceptible to mechanical irregularities, wobble, or runout of the target 24 or other sensor system disturbances.

The magnetic field sensor 700 can include an error processor 790, an adjustment processor 792, and/or an object feature detection processor 794, each coupled and each having functions the same as or similar to similar elements of FIG. 5. Magnetic field sensors described in conjunction with figures below can also include these elements.

While the signals 722a, 722b are referred to above as peak signals 722a, 722b, or as a PDAC signal 722a and an NDAC signal 722b, the signals 722a, 722b can also be referred to herein as peak-related signals. While the signals 732a, 732b, 752a, 752b are referred to above as selected samples, the signals 732a, 732b, 752a, 752b can also be referred to herein as sampled signals. The same pertains to similar signals in FIGS. 13-16.

Figure 13:
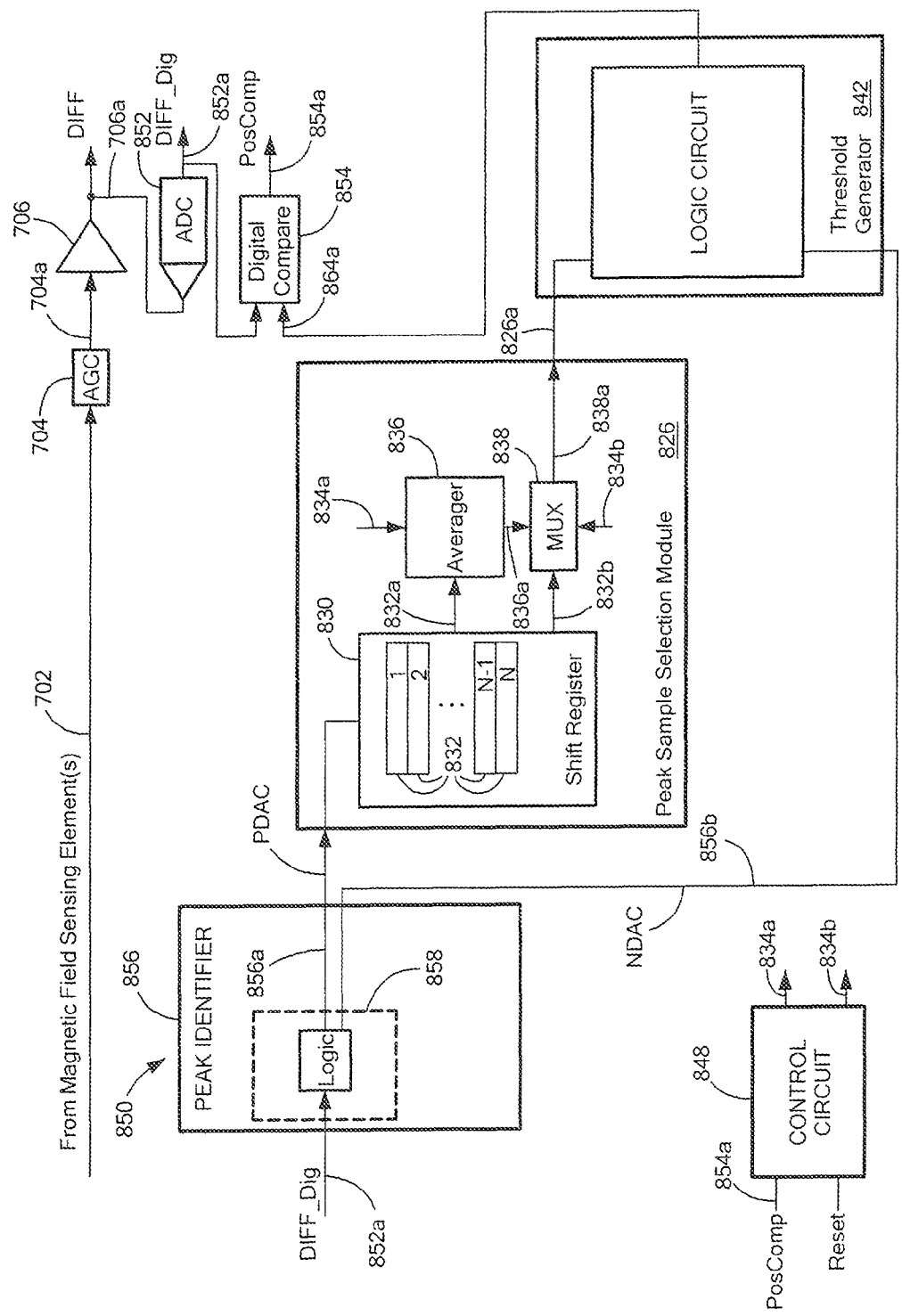
FIG. 13 is a block diagram of another exemplary motion detector that can be as the motion detectors of FIGS. 1, 1B, 2, and 2A, having a digital peak identifier, a peak sample selection module, a threshold generator, and a digital comparator.

Referring now to FIG. 13, in which like elements of FIG. 12 are shown having like reference designations, a circuit 850 can have characteristics similar to those of the circuit 700 of FIG. 12; however, some of the analog circuits shown in FIG. 12 are replaced by corresponding digital circuits. For example, the peak identifier 722 of FIG. 12 can be replaced by a peak identifier 856 that implements the peak identifier functionality of tracking and holding positive and negative peaks of the DIFF signal with a logic circuit 858. The peak identifier logic circuit 858 is coupled to receive a digital version 852a of the DIFF signal 706a that has been digitized by an analog-to-digital converter 852, and is configured to generate a positive peak tracking PDAC signal 856a and a negative peak tracking NDAC signal 856b, both of which are digital signals.

A peak sample selection module 826 can be entirely digital, not requiring the analog-to-digital converter 728 or the DAC 740 of FIG. 12. The peak sample selection module 826 is configured to generate a positive selected peak signal 826a, similar to the positive selected peak signal 726a of FIG. 12, but which can be a digital signal.

In the embodiment of FIG. 13, a negative peak sample selection module is omitted and the NDAC signal 856b is coupled directly to the threshold generator 842. It will be appreciated that this approach of using a positive selected peak signal 826a and the NDAC signal 856b to generate the threshold 464a may be sufficient to gain at least some of the threshold accuracy benefits of the invention. For example, in some magnetic field sensing element configurations such as those in which a single element detects the target features (e.g., FIG. 1), the positive DIFF signal peaks may vary more significantly and more quickly in response to target anomalies than the negative DIFF signal peaks. Thus, in such embodiments, a negative peak sample selection module may be omitted. Whereas in other magnetic field sensing element configurations, such as those in which multiple elements are used to generate the DIFF signals as the difference between signals from multiple magnetic field sensing elements (e.g., FIG. 1B), the positive and negative peaks of the DIFF signals generally vary to the same extent and in the same manner in response to target anomalies. Thus, in these types of embodiments, it is generally desirable to include both the positive and negative peak sample selection modules.

The circuit 850 can include a digital threshold generator 842 including a logic circuit that, like the analog threshold generator 380 of FIG. 12, can generate a threshold signal 864a that is at a first level corresponding to a first percentage of the difference between the positive selected peak signal 826a and the NDAC voltage 856b when the DIFF_Dig signal 852a exceeds the threshold signal 864a and is at a second level corresponding to a second percentage of the difference between the positive selected peak signal 826a and the NDAC voltage 856b when the DIFF_Dig signal 852a is less than the threshold signal 864a.

The circuit 850 can include a digital comparator 854 coupled to receive an output signal 864a from the threshold generator 842 and also coupled to receive the digitized DIFF_Dig signal 852a. The digital comparator 854 is configured to generate a PosComp signal 854a, which can be the same as or similar to the PosComp signal 708a of FIG. 12.

It will be appreciated that many of the functions of the circuit 850 are implemented with digital circuits that perform the same or similar functions to the analog circuits of the circuit 700 of FIG. 12.

In some embodiments, the NDAC signal 856b is indicative of a plurality of negative peaks of the DIFF_Dig signal 852a, as may be averaged or otherwise combined in the logic circuit 858. In some embodiments, the NDAC signal 856b updates slowly to changes, and in other embodiments, the NDAC signal 856b updates quickly. In some embodiments, the NDAC signal 856b updates more quickly to changes in one direction than to changes in the other direction.

It will be appreciated that a similar magnetic field sensor can store samples of the NDAC signal 856b, and not store samples of the PDAC signal 856a.

Figure 14:
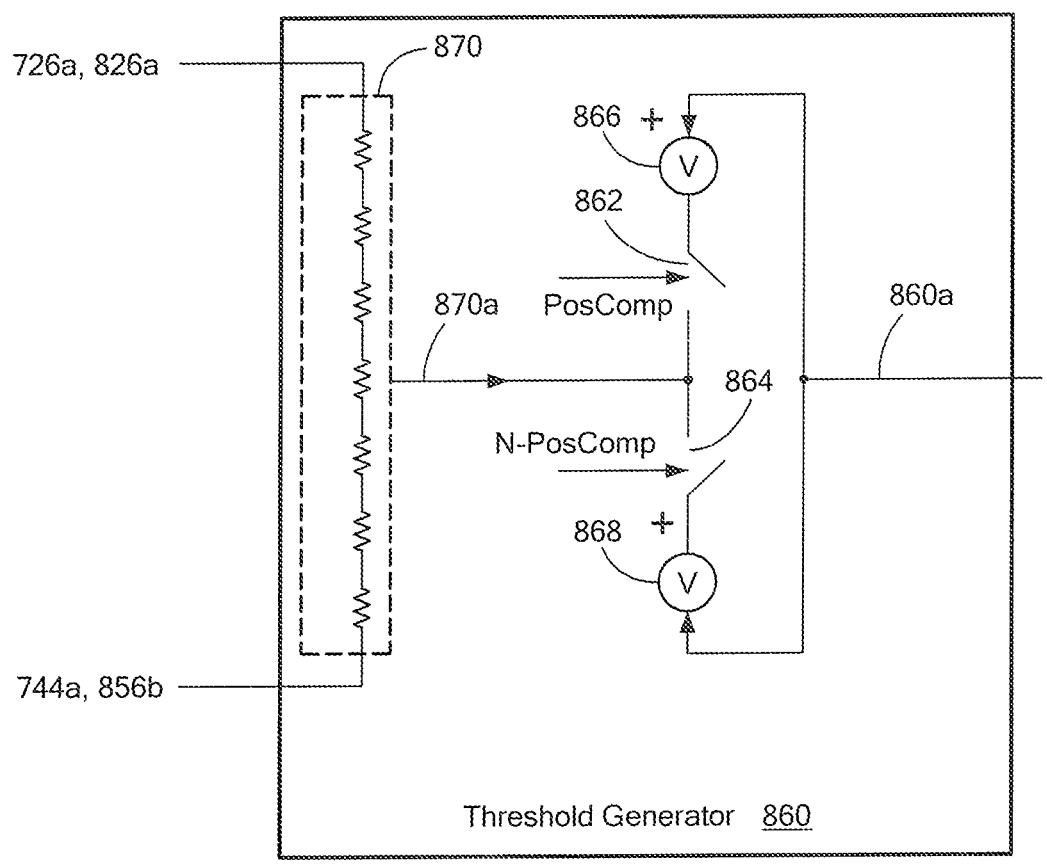
FIG. 14 is a block diagram of an exemplary threshold generator that can be used as the threshold generator of FIGS. 12 and 13.

Referring now to FIG. 14, an alternative threshold generator 860 is shown that may be used in place of the threshold generators of FIGS. 12 and 13. It will be appreciated that in the context of the digital circuitry of FIG. 13, the selected peak signal 826a and NDAC signal 856b would require conversion to an analog form for use of the threshold generator 860. Threshold generator 860 may include a resistor ladder 870 across which the positive selected peak signal, such as 726a of FIG. 12 or signal 826a of FIG. 13, and the negative selected peak signal 744a of FIG. 12 or the NDAC signal 856b of FIG. 13 are coupled.

The resistor ladder 870 may have a center tap 870 at which the 50% point between the voltage across the resistor ladder is provided. The center tap 870a may be coupled to offset voltage sources 866 and 868 via switches 862 and 864, respectively, as shown. The switch 862 may be controlled by the PosComp signal, such as signal 854a of FIG. 13, and the switch 864 may be controlled by an inverted version, N-PosComp, of the PosComp signal. With this arrangement, the threshold signal 860a, which may be the same as or similar to the threshold signal 716 of FIG. 12 or threshold signal 864a of FIG. 13, may be provided as a predetermined offset voltage (established by the voltage source 866) greater than the mid-point between the positive selected peak signal and negative selected peak signal (or NDAC signal) when the DIFF signal is less than the threshold and as a predetermined offset voltage (established by the voltage source 868) less than the mid-point between the positive selected peak signal and negative selected peak signal (or NDAC signal) when the DIFF signal is greater than the threshold.

Figure 15:
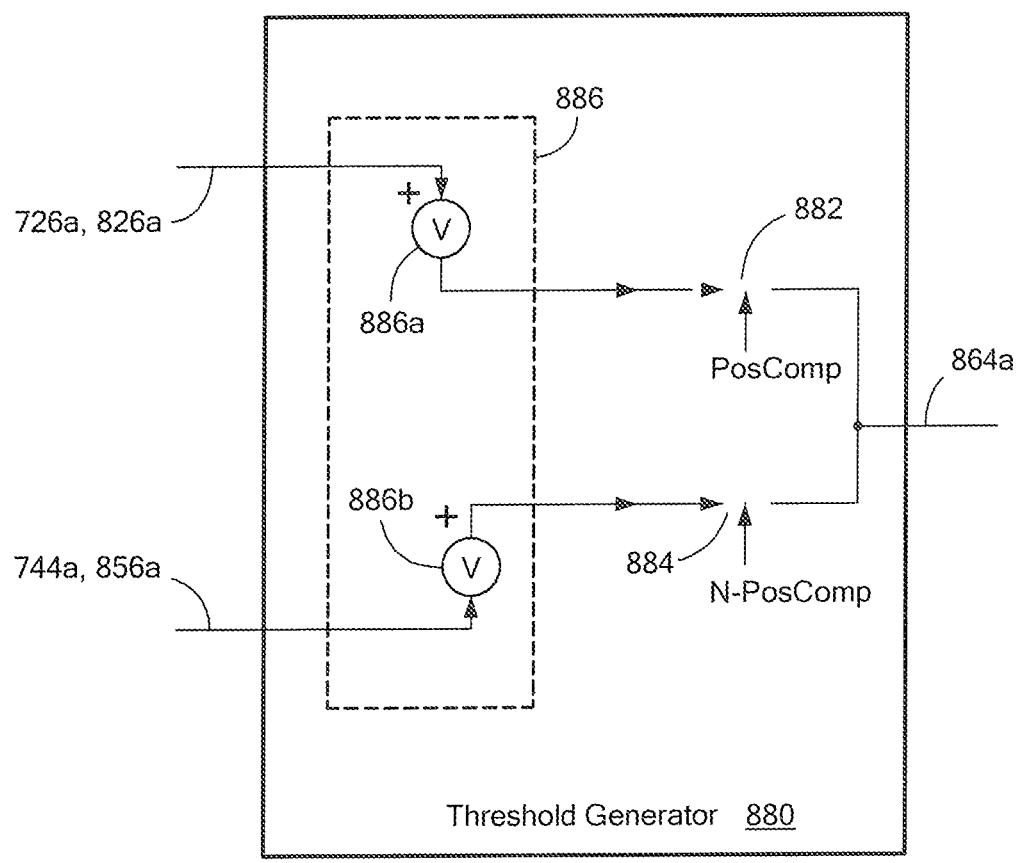
FIG. 15 is a block diagram of yet another exemplary threshold generator that can be used as the threshold generator of FIGS. 12 and 13.

Referring now to FIG. 15, another alternative threshold generator 880 suitable for use in place of the threshold generators of FIGS. 12 and 13 is shown to include an offset voltage source 886 having a first offset voltage source 886a for coupling to the positive selected peak signal 726a of FIG. 12 or 826a of FIG. 13 and a second offset voltage source 886b for coupling to the negative selected peak signal 744a of FIG. 12 or the NDAC signal 856b of FIG. 13. It will be appreciated that in the context of the digital circuitry of FIG. 13, the selected peak signal 826a and NDAC signal 856b would require conversion to an analog form for use of the threshold generator 880.

The offset voltage source 886a is coupled to a switch 882 that is controlled by the PosComp signal and the voltage source 886b is coupled to a switch 884 that is controlled by an inverted version, N-PosComp, of the PosComp signal. With this arrangement, the threshold signal 864a, which may be the same as or similar to the threshold signal 716 of FIG. 12 or threshold signal 864a of FIG. 13, may be provided as a predetermined offset voltage (established by the voltage source 886a) less than the positive selected peak signal when the DIFF signal is less than the threshold and as a predetermined offset voltage (established by the voltage source 886b) greater than the negative selected peak signal (or NDAC signal) when the DIFF signal is greater than the threshold.

Figure 16:
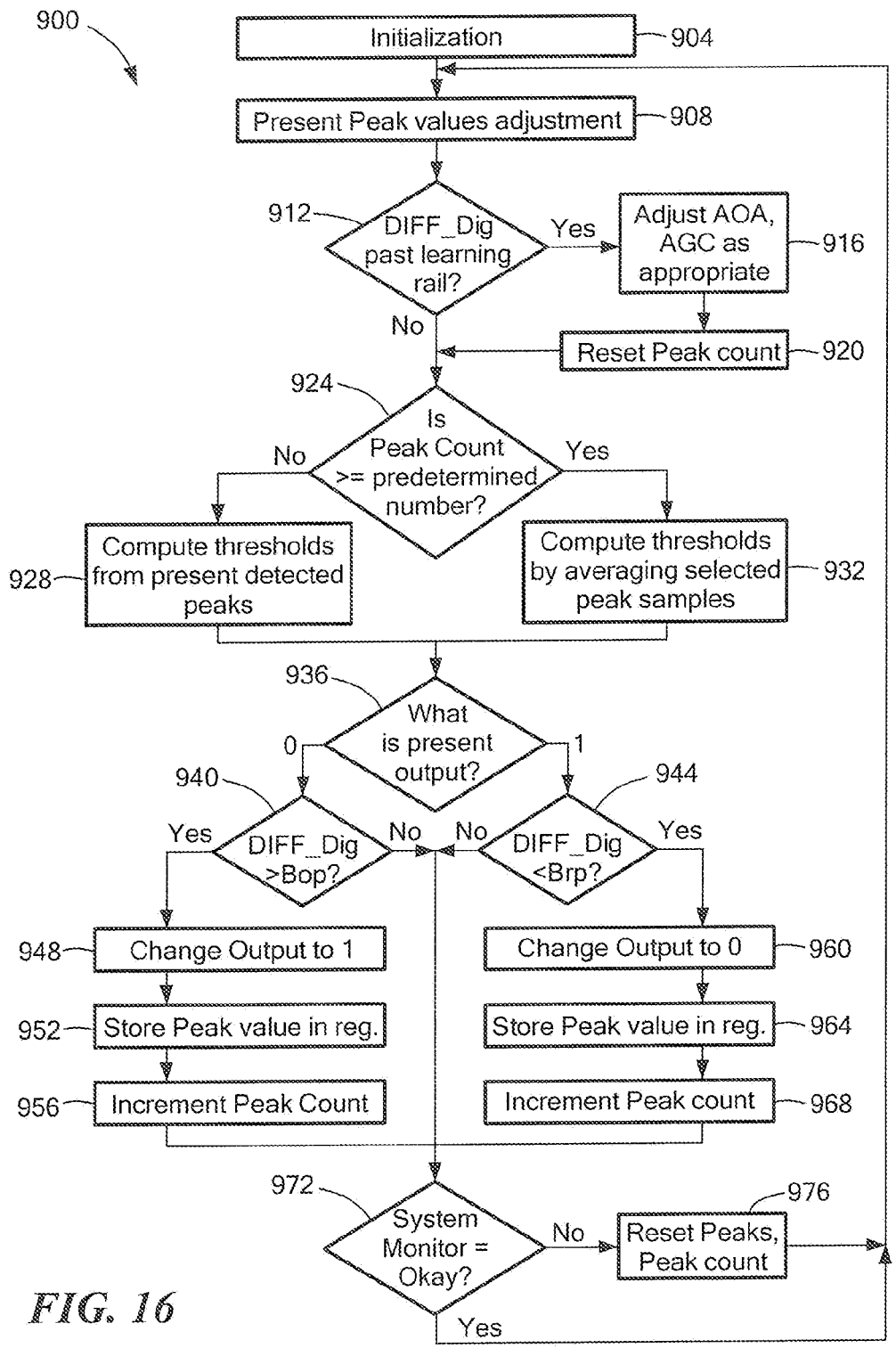
FIG. 16 is a flow diagram showing an illustrative method for generating thresholds for a magnetic field sensor.

Referring now to FIG. 16, a method 900 for computing the threshold signals, such as signals 216a-216h of FIG. 3, begins with an initialization step 904 during which the circuitry is reset to a known state. In step 908, the present peak values of the DIFF signal as tracked by the peak identifier, such as peak identifier 722 of FIG. 12 or peak identifier 856 of FIG. 13, are adjusted, or updated. Various schemes are possible for updating the PDAC and NDAC signal levels, some of which are described in the above-referenced U.S. Pat. No. 6,525,531 and others of which are described in U.S. Patent Application Publication Nos. 2011/0298447, 2011/0298448, and 2011/0298449, which applications are assigned to the Assignee of the subject invention and are hereby incorporated by reference. For example, the update logic of peak identifier 722 of FIG. 12 or logic 858 of peak identifier 856 of FIG. 13 may be configured to allow the PDAC and NDAC voltages to track the DIFF signal outwardly (i.e., the PDAC voltage follows the DIFF signal to its positive peaks and the NDAC voltage follows the DIFF signal to its negative peaks), but upon each transition of the PosComp signal, the PDAC and NDAC voltages selectively allowed to move "inwardly" (i.e., PDAC decreases and NDAC increases) to the level of the DIFF signal.

In a step 912, it is determined whether automatic gain adjustment (AGC) and/or automatic offset adjustment (AOA) functions should be performed, by determining whether the DIFF_Dig signal (or the DIFF signal depending on the embodiment) has passed a learning rail level that is associated with predetermined DIFF signal gain and offset conditions. If it is determined that the DIFF_Dig signal has passed the learning rail, then in step 916, the DIFF_Dig signal offset and/or gain are adjusted, such as with AGC and AOA circuitry and techniques described above. In step 920, a peak count value (e.g., a counter in the control circuit 746 of FIG. 12 or control circuit 848 of FIG. 13) is reset.

Once the DIFF_Dig signal has been gain and/or offset adjusted if necessary, the thresholds are computed starting in step 924 in which it is determined whether a predetermined number of DIFF_Dig signal peaks has occurred, such as four peaks in one embodiment. This step can be achieved with a counter in the control circuit 746 of FIG. 12 or 848 of FIG. 13 for example. If the predetermined number of peaks has not occurred, then in step 928, thresholds are computed based on the peaks in the present DIFF signal cycle, as demonstrated in the shown example, or using a predetermined simpler threshold such as a fixed threshold. For example, in each of the first three DIFF signal cycles in FIG. 3, the thresholds 216a-216f are based on the peaks detected in the respective cycle, as may be achieved by the multiplexer 738 (FIG. 12) passing through the stored peak 732b from the current cycle. Recall that this manner of computing the thresholds is advantageous during an initial, sometimes referred to as a calibration, time period after power up when there is insufficient prior peak history.

If however it is determined that the predetermined number of peaks has occurred, then in step 932, the thresholds are alternatively computed as a function of a predetermined set of stored peak signal samples. For example, upon detecting that four peaks of the DIFF signal have occurred, the thresholds 216g-216h (FIG. 3) may be computed as an average of the peak sample from the current cycle and the peak samples from each of the three prior cycles, as may be achieved by the function processor 736 of FIG. 12 for example.

It will be appreciated that alternatively, the average of four samples of the peak signal may be computed from four samples of the peak signal taken during four prior cycles of the DIFF signal (rather than from three samples taken during three prior cycles and a sample taken during the present cycle). It will also be appreciated that while four peak signal samples is discussed in the illustrative embodiment herein for use in generating the thresholds, other numbers of peak signal samples from prior DIFF signal cycles or from prior and present DIFF signal cycles is possible. Use of digital electronics can be conducive to averaging a number of samples that is a power of two (e.g., 2, 4, 8, 16, etc.), although other numbers of samples can also be used. The number of averaged samples is generally based on weighing the threshold accuracy benefits against the additional implementation "cost" of processing more samples.

In some embodiments, four peak samples can be used (or combined). However, the number of peak samples that is used can be more than four or fewer than four. Occurrence of the predetermined number of peaks can end the calibration mode of operation and begin the running mode of operation in step 932.

Once the thresholds are computed in step 928 or 932, the state of the PosComp signal is determined in step 936. If the state of the PosComp signal is a logic zero, it is determined in step 940 if the DIFF_Dig signal is greater than the operate threshold Bop (e.g., such as threshold 216g of FIG. 3), and if it is, then the PosComp signal level is changed to a logic one in step 948, the PDAC signal is sampled and stored in memory in step 952, and a peak count value maintained in the control circuit, such as control circuit 746 of FIG. 12 or control circuit 848 of FIG. 13, is incremented. Alternatively, if the PosComp signal level is at a logic one, then it is determined in step 944 whether the DIFF_Dig signal is less than the release threshold Brp (e.g., such as threshold 216h of FIG. 3) in step 944, and if it is, then the PosComp signal level is changed to a logic zero in step 960, the NDAC signal is sampled and stored in memory in step 964, and the peak count value is incremented. In other embodiments, it is also possible to store both NDAC and PDAC values at every change of PosComp.

In step 972, a system monitoring function of the control circuit is checked and if the system monitor check is positive, then the process repeats with the peak value adjustment step 908. Alternatively, if the system monitor check is negative, then the PDAC and NDAC (e.g., the PDAC and NDAC in the peak identifier 722 of FIG. 12) and the peak count value (e.g., the counters in the peak identifier 722 of FIG. 12) are reset in step 976 following which the process repeats with the peak value adjustment step 908, as shown. The system monitoring function of the control circuit can monitor various system functions. As one example, an additional set of thresholds is compared to the DIFF signal and if several transitions occur based on the additional thresholds when no transitions occurred based on the above-described thresholds, then a fault indication is provided.

It should be appreciated that parts of the circuits above can be interchanged with each other. For example, an analog peak sample selection module such as the peak sample selection module 726 of FIG. 12 can be used in the circuit of FIG. 13.

Referring now to FIG. 17, four graphs 1000, 1020, 1040, 1060 each has a vertical scale in units of voltage in arbitrary units, and each has a horizontal scale in units of time in arbitrary units. The graph 1000 is representative of a DIFF signal, for example, the DIFF signal 20a of FIG. 1, in the presence of a rotating target that has one tooth. Positive and negative peaks of the graph 1000 are expected to have the same amplitudes. In contrast, the graph 1020 is representative of a DIFF signal in the presence of a rotating target that has four teeth, the graph 1040 is representative of a DIFF signal in the presence of a rotating target that has six teeth, and the graph 1050 is representative of a DIFF signal in the presence of a rotating target that has five teeth. As may be expected, positive and negative peaks associated with any one tooth may have the same amplitude, but the amplitudes can be different as the different teeth pass by a magnetic field sensor.

It is possible by the above magnetic field sensors and related techniques to provide threshold signals appropriate for individual gear teeth for a known predetermined target with a known predetermined number of gear teeth. However, it would be desirable to provide magnetic field sensors and related techniques that can provide threshold signals appropriate for predetermined targets with a variety of different numbers of gear teeth or features. To this end, the above magnetic field sensors and related techniques can be designed to provide threshold signals appropriate for individual gear teeth associated with a least common multiple of all possible numbers of gear teeth. In other words, for example, if the possible targets can have two, three, four, or six gear teeth, the above described magnetic field sensors can be designed to accommodate twelve gear teeth (or twenty-four, forty-eight, and so on). With this arrangement, a selected stored peak sample or a selected stored threshold sample at a present time that is associated with a gear tooth twelve gear teeth ago will be associated with the same gear tooth passing at the present time for gears that have two, three, four, or six gear teeth. This should be apparent from the graphs 1000, 1020, and 1040. However, inspecting the graph 1060, for which a gear has five gear teeth represented by five different positive peak values in a DIFF signal, it will be apparent that a selection of a peak stored peak value or a stored threshold value for a gear tooth twelve gear teeth in the past will lead to an improper threshold.

An improper stored value to be used can be detected, for example, by the error processor 344 of FIG. 5 or the error processor 790 of FIG. 12. The magnetic field sensors can, for example, by trial and error, adjust which stored values they use until such time that the error signals 344a, 790a are below a predetermined limit. However in other embodiments, by way of the object feature quantity detection processors 342, 794 of FIGS. 5 and 12, respectively, the magnetic field sensors can directly identify the quantity of target object features (teeth) and (store and) use the proper stored values accordingly.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

The invention claimed is:

1. A magnetic field sensor for detecting a movement of an object, wherein the object has a plurality of object features, wherein a quantity of the object features belongs to a set of possible quantities of object features, wherein the set has a least common multiple of possible quantities of object features, wherein the magnetic field sensor comprises:
   a magnetic field sensing element for generating a magnetic field signal responsive to the object features as they pass by the magnetic field sensing element, wherein the magnetic field signal comprises a plurality of magnetic field signal cycles, wherein each one of the plurality of magnetic field signal cycles is indicative of a respective one of the plurality of object features passing by the magnetic field sensing element, wherein the plurality of magnetic field signal cycles includes a present magnetic field signal cycle and a plurality of past magnetic field signal cycles; and
   a motion detector coupled to the magnetic field sensing element and configured to generate a motion signal indicative of the movement of the object, wherein the motion signal has a plurality of rising edges and a plurality of falling edges, wherein each rising edge and each falling edge is associated with a respective one of the plurality of magnetic field signal cycles, wherein the motion detector comprises:
   a peak identifying circuit for identifying at least one of a plurality of positive peaks of the magnetic field signal or a plurality of negative peaks of the magnetic field signal to provide a peak signal indicative of the at least one of the plurality of positive peaks of the magnetic field signal or of the plurality of negative peak of the magnetic field signal;
   a sample selection circuit module coupled to receive a peak-related signal related to the peak signal and configured to store a plurality of samples of the peak-related signal, wherein the sample selection circuit module is further configured to sequentially recall stored samples of the peak-related signal from the stored plurality of samples to generate a sampled signal, wherein each sequentially selected stored sample within the sampled signal is associated with a respective one of the plurality of prior cycles of the magnetic field signal that occurred a quantity of prior cycles ago equal to an integer multiple of the least common multiple of the possible quantities of the object features; and
   a comparator coupled to receive a signal related to the sampled signal, coupled to receive the magnetic field signal, and configured to compare the signal related to the sampled signal with the magnetic field signal in order to generate the motion signal.

2. The magnetic field sensor of claim 1, wherein the least common multiple is twelve.

3. The magnetic field sensor of claim 1, further comprising:
   a threshold generator coupled to receive the sampled signal and configured to use the sampled signal to generate the signal related to the sampled signal as a threshold signal a predetermined percentage of a difference between the plurality of positive peaks of the magnetic field signal and selected ones of the plurality of negative peaks of the magnetic field signal.

4. The magnetic field sensor of claim 1, wherein the stored peak signal is indicative of the at least one of the plurality of positive peaks of the magnetic field signal, and wherein the magnetic field sensor further comprises:
   a threshold generator coupled to receive the sampled signal and configured to use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

5. The magnetic field sensor of claim 1, wherein the stored peak signal is indicative of the at least one of the plurality of negative peaks of the magnetic field signal, and wherein the magnetic field sensor further comprises:
   a threshold generator coupled to receive the sampled signal and configured to use the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

6. The magnetic field sensor of claim 1, further comprising:
   a threshold generator coupled to receive the peak signal and configured to generate the peak-related signal as a threshold signal, wherein the threshold signal comprises values between respective ones of the plurality of positive peaks of the magnetic field signal and selected of the plurality of negative peaks of the magnetic field signal.

7. The magnetic field sensor of claim 1, wherein the sampled signal is one of a plurality of sampled signals, wherein each sampled signal is associated with a different respective one of the plurality of prior cycles of the magnetic field signal, each occurring a quantity of prior cycles ago equal to a different integer multiple of the least common multiple of the possible quantities of the object features, wherein the motion detector further comprises:
   a function processor configured to combine selected ones of the samples within the plurality of sampled signals to generate the signal related to the sampled signal as a combined signal.

8. The magnetic field sensor of claim 7, wherein the function processor is configured to average the selected ones of the samples within the plurality of sampled signals to generate the sampled signal as an averaged signal.

9. The magnetic field sensor of claim 7, further comprising:
   a threshold generator coupled to receive the combined signal and configured to use the combined signal to generate the signal related to the sampled signal as a threshold signal a predetermined percentage of a difference between the plurality of positive peaks of the magnetic field signal and selected ones of the plurality of negative peaks of the magnetic field signal.

10. The magnetic field sensor of claim 7, wherein the stored peak signal is indicative of the at least one of the plurality of positive peaks of the magnetic field signal, and wherein the magnetic field sensor further comprises:
   a threshold generator coupled to receive the sampled signal and configured to use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

11. The magnetic field sensor of claim 7, wherein the stored peak signal is indicative of the at least one of the plurality of negative peaks of the magnetic field signal, and wherein the magnetic field sensor further comprises:
a threshold generator coupled to receive the sampled signal and configured to use the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

12. The magnetic field sensor of claim 11, wherein the function processor is configured to average the selected ones of the samples within the plurality of sampled signals to generate the sampled signal as an averaged signal.

13. The magnetic field sensor of claim 7, further comprising:
a threshold generator coupled to receive the peak signal and configured to generate the peak-related signal as a threshold signal, wherein the threshold signal comprises values between respective ones of the plurality of positive peaks of the magnetic field signal and selected ones of the plurality of negative peaks of the magnetic field signal.

14. The magnetic field sensor of claim 13, wherein the function processor is configured to average the selected ones of the samples within the plurality of sampled signals to generate the sampled signal as an averaged signal.

15. The magnetic field sensor of claim 1, further comprising an error processor coupled to receive the peak-related signal and coupled to receive the sampled signal, wherein:
if a value of the peak-related signal and a value of the sampled signal differ by more than a predetermined amount, the error processor is configured to generate an error signal having a predetermined state indicative of an error condition.

16. The magnetic field sensor of claim 15, further comprising:
an adjustment processor coupled to receive the error signal, and in response to the error condition, the sample selection circuit module is configured to provide the peak-related signal as the sampled signal.

17. The magnetic field sensor of claim 15, further comprising:
an adjustment processor coupled to receive the error signal, and in response to the error condition, the sample selection circuit module is configured to change a value of the least common multiple.

18. The magnetic field sensor of claim 1, further comprising:
an object feature quantity detection processor configured to receive the motion signal and configured to calculate a quantity of object features value indicative of the quantity of object features upon the object, wherein the sample selection circuit module is configured to change a value of the least common multiple in accordance with the quantity of object features value.

19. A method of detecting a movement of an object, wherein the object has a plurality of object features, wherein a quantity of the object features belongs to a set of possible quantities of object features, wherein the set has a least common multiple of possible quantities of object features, wherein the method comprises:
generating a magnetic field signal proportional to a magnetic field associated with the object, wherein the magnetic field signal comprises a plurality of magnetic field signal cycles, wherein each one of the plurality of magnetic field signal cycles is indicative of a respective one of the plurality of object features passing by the magnetic field sensing element, wherein the plurality of magnetic field signal cycles includes a present magnetic field signal cycle and a plurality of past magnetic field signal cycles; and
generating a motion signal indicative of the movement of the object, wherein the motion signal has a plurality of rising edges and a plurality of falling edges, wherein each rising edge and each falling edge is associated with a respective one of the plurality of magnetic field signal cycles, wherein the generating the motion signal comprises:
identifying at least one of a plurality of positive peaks of the magnetic field signal or a plurality of negative peaks of the magnetic field signal to provide a peak signal indicative of the at least one of the plurality of positive peaks of the magnetic field signal or of the plurality of negative peak of the magnetic field signal;
storing a plurality of samples of the peak-related signal;
sequentially recalling stored samples of the peak-related signal from the stored plurality of samples to generate a sampled signal, wherein each sequentially selected stored sample within the sampled signal is associated with a respective one of the plurality of prior cycles of the magnetic field signal that occurred a quantity of prior cycles ago equal to an integer multiple of the least common multiple of the possible quantities of the object features; and
comparing the signal related to the sampled signal with the magnetic field signal in order to generate the motion signal.

20. The method of claim 19, wherein the least common multiple is twelve.

21. The method of claim 19, further comprising:
using the sampled signal to generate the signal related to the sampled signal as a threshold signal a predetermined percentage of a difference between the plurality of positive peaks of the magnetic field signal and selected ones of the plurality of negative peaks of the magnetic field signal.

22. The method of claim 19, wherein the stored peak signal is indicative of the at least one of the plurality of positive peaks of the magnetic field signal, and wherein the magnetic field sensor further comprises:
using use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

23. The method of claim 19, wherein the stored peak signal is indicative of the at least one of the plurality of negative peaks of the magnetic field signal, and wherein the method further comprises:
using the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

24. The method of claim 19, further comprising:
generating the peak-related signal as a threshold signal, wherein the threshold signal comprises values between respective ones of the plurality of positive peaks of the magnetic field signal and selected ones of the plurality of negative peaks of the magnetic field signal.

25. The method of claim 19, wherein the sampled signal is one of a plurality of sampled signals, wherein each sampled signal is associated with a different respective one of the plurality of prior cycles of the magnetic field signal, each occurring a quantity of prior cycles ago equal to a different integer multiple of the least common multiple of the possible quantities of the object features, wherein the method further comprises:

combining selected ones of the samples within the plurality of sampled signals to generate the signal related to the sampled signal as a combined signal.

26. The method of claim 25, wherein the combining comprises averaging the selected ones of the samples within the plurality of sampled signals to generate the sampled signal as an averaged signal.

27. The method of claim 25, further comprising:

using the combined signal to generate the signal related to the sampled signal as a threshold signal a predetermined percentage of a difference between the plurality of positive peaks of the magnetic field signal and selected ones of the plurality of negative peaks of the magnetic field signal.

28. The method of claim 25, wherein the stored peak signal is indicative of the at least one of the plurality of positive peaks of the magnetic field signal, and wherein the method further comprises:

using use the sampled signal to generate the signal related to the sampled signal as a threshold signal a predetermined percentage of a difference between the plurality of positive peaks of the magnetic field signal and a combination of selected ones of the plurality of negative peaks of the magnetic field signal.

29. The method of claim 25, wherein the stored peak signal is indicative of the at least one of the plurality of negative peaks of the magnetic field signal, and wherein the method further comprises:

using the sampled signal to generate the signal related to the sampled signal as a threshold signal a predetermined percentage of a difference between a combination of selected ones of the plurality of positive peaks of the magnetic field signal and the plurality of negative peaks of the magnetic field signal.

30. The method of claim 29, wherein the combining comprises averaging the selected ones of the samples within the plurality of sampled signals to generate the sampled signal as an averaged signal.

31. The method of claim 25, further comprising:

generating the peak-related signal as a threshold signal, wherein the threshold signal comprises values between respective ones of the plurality of positive peaks of the magnetic field signal and adjacent respective ones of the plurality of negative peaks of the magnetic field signal.

32. The method of claim 31, wherein the combining comprises averaging the selected ones of the samples within the plurality of sampled signals to generate the sampled signal as an averaged signal.

33. The method of claim 19, further comprising:

if a value of the peak-related signal and a value of the sampled signal differ by more than a predetermined amount, generating an error signal having a predetermined state indicative of an error condition.

34. The method of claim 33, further comprising:

in response to the error condition, providing the peak-related signal as the sampled signal.

35. The method of claim 33, further comprising:

in response to the error condition, changing a value of the least common multiple.

36. The method of claim 19, further comprising:

calculating a quantity of object features value indicative of the quantity of object features upon the object; and changing a value of the least common multiple in accordance with the quantity of object features value.

\* \* \* \* \*

UNITED STATES PATENT AND TRADEMARK OFFICE
CERTIFICATE OF CORRECTION

PATENT NO. : 9,476,899 B2
APPLICATION NO. : 14/452823
DATED : October 25, 2016
INVENTOR(S) : Devon Fernandez et al.

Page 1 of 1

It is certified that error appears in the above-identified patent and that said Letters Patent is hereby corrected as shown below:

In the Specification

Column 7, Line 62 delete "using use" and replace with --using--.

Column 9, Line 34 delete "Fig. 1 is block" and replace with --Fig. 1 is a block--.

Column 10, Line 8 delete "comparator, and" and replace with --comparator,--.

Column 10, Line 59 delete "sensor, and" and replace with --sensor; and--.

Column 17, Line 43 delete "an NDAC, 126" and replace with --an NDAC 126--.

Column 21, Line 56 delete "PosComp" and replace with --POSCOMP--.

Column 22, Line 7 delete "processor 736" and replace with --processor 336--.

Column 30, Lines 36 through 39 delete "In general, the stored samples can be from all or some previous revolutions from which revolutions the stored samples can be from all or some target features from those revolutions." and replace with --In general, the stored samples can be from all or some previous revolutions of the target, and the stored samples can be from all or some target features from those revolutions--.

Column 32, Line 40 delete "threshold 464$a$" and replace with --threshold 864$a$--.

Column 34, Line 66 delete "If however it is" and replace with --If however, it is--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*